United States Patent
Lee et al.

(10) Patent No.: US 9,554,339 B2
(45) Date of Patent: Jan. 24, 2017

(54) METHOD FOR CONTROLLING UPLINK TRANSMISSION POWER IN WIRELESS COMMUNICATION SYSTEM AND DEVICE THEREFOR

(71) Applicant: LG ELECTRONICS INC., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/031,637

(22) PCT Filed: Nov. 10, 2014

(86) PCT No.: PCT/KR2014/010733
§ 371 (c)(1),
(2) Date: Apr. 22, 2016

(87) PCT Pub. No.: WO2015/069072
PCT Pub. Date: May 14, 2015

(65) Prior Publication Data
US 2016/0242125 A1    Aug. 18, 2016

Related U.S. Application Data

(60) Provisional application No. 61/902,216, filed on Nov. 9, 2013, provisional application No. 61/902,282, filed (Continued)

(51) Int. Cl.
*H04B 7/00* (2006.01)
*H04W 52/24* (2009.01)
(Continued)

(52) U.S. Cl.
CPC ......... *H04W 52/246* (2013.01); *H04W 52/146* (2013.01); *H04W 52/248* (2013.01);
(Continued)

(58) Field of Classification Search
CPC ........... H04W 52/146; H04W 72/0413; H04W 72/042; H04W 52/325; H04W 72/0446; H04W 52/54; H04W 72/0473; H04W 72/1289; H04W 52/10; H04W 72/04; H04W 52/04; H04W 52/08
(Continued)

(56) References Cited

U.S. PATENT DOCUMENTS

| | | |
|---|---|---|
| 2013/0114562 A1 | 5/2013 | Seo et al. |
| 2013/0155898 A1* | 6/2013 | Yin ..................... H04L 1/0026 370/254 |
| 2013/0195066 A1 | 8/2013 | Lee et al. |

FOREIGN PATENT DOCUMENTS

| | | |
|---|---|---|
| KR | 10-2012-0041659 A | 5/2012 |
| KR | 10-2013-0018052 A | 2/2013 |

(Continued)

*Primary Examiner* — Keith Ferguson
(74) *Attorney, Agent, or Firm* — Birch, Stewart, Kolasch & Birch, LLP

(57) ABSTRACT

The present invention relates to a method for controlling uplink transmission power of a terminal in a wireless communication system, the method comprising the steps of: transmitting an uplink signal according to a predetermined uplink-downlink configuration with respect to a serving cell, receiving first transmission power control information for a first set of uplink sub-frames and second transmission power control information for a second set of uplink sub-frames from the serving cell, and transmitting a physical uplink shared channel (PUSCH) on a particular sub-frame included in the second set of uplink sub-frames, according to the second transmission power control information, wherein the second set of uplink sub-frames is configured by at least one uplink sub-frame specified by a upper layer signaling among a plurality of uplink sub-frames according to the predetermined uplink-downlink configuration.

16 Claims, 9 Drawing Sheets

Related U.S. Application Data on Nov. 10, 2013, provisional application No. 61/933,323, filed on Jan. 30, 2014.

(51) Int. Cl.
  *H04W 52/14* (2009.01)
  *H04W 52/58* (2009.01)
  *H04W 72/04* (2009.01)
  *H04W 88/02* (2009.01)

(52) U.S. Cl.
  CPC ....... *H04W 52/58* (2013.01); *H04W 72/0413* (2013.01); *H04W 88/02* (2013.01)

(58) Field of Classification Search
  USPC .... 455/522, 69, 68, 445, 67.11, 67.13, 63.1, 455/63.2, 500, 517, 422.1, 403, 550.1, 455/127.1; 370/252, 328, 329, 338, 318, 370/343
  See application file for complete search history.

(56) References Cited

FOREIGN PATENT DOCUMENTS

| KR | 10-2013-0041813 A | 4/2013 |
| KR | 10-2013-0109159 A | 10/2013 |

\* cited by examiner

FIG. 2
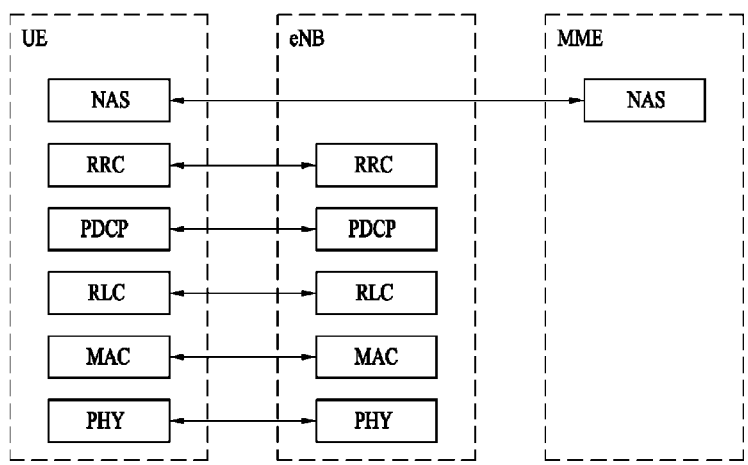
(a) Control-plane protocol stack
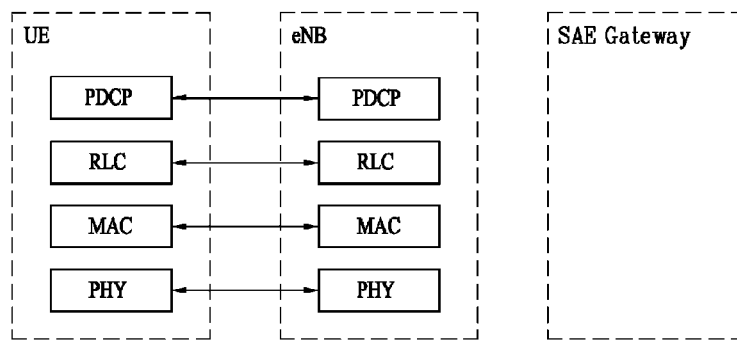
(b) User-plane protocol stack

METHOD FOR CONTROLLING UPLINK TRANSMISSION POWER IN WIRELESS COMMUNICATION SYSTEM AND DEVICE THEREFOR

CROSS REFERENCE TO RELATED APPLICATIONS

This application is the National Phase of PCT International Application No. PCT/KR2014/010733, filed on Nov. 10, 2014, which claims priority under 35 U.S.C. 119(e) to U.S. Provisional Application No. 61/902,216, filed on Nov. 9, 2013, 61/902,282 filed on Nov. 10, 2013 and 61/933,323 filed on Jan. 30, 2014, all of which are hereby expressly incorporated by reference into the present application.

TECHNICAL FIELD

The present invention relates to a wireless communication system, and more particularly, to a method of controlling uplink transmission power in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

Recently, ongoing effort to standardize a follow-up technology for LTE is in progress by 3GPP. In the present specification, the technology is referred to as 'LTE-A'. LTE-A system aims to support a wideband of maximum 100 MHz. To this end, the LTE-A system uses a carrier aggregation (CA) technology to achieve the wideband using a plurality of frequency blocks. In order to use a wider frequency band, the CA uses a plurality of the frequency blocks as a single huge logical frequency band. A bandwidth of each frequency block can be defined based on a bandwidth of a system block used in LTE system. Each of a plurality of the frequency blocks can be referred to as a component carrier (CC) or a cell.

And, in LTE system, it is able to support a duplex operation for dividing all available resources into a downlink resource (i.e., a resource used by a base station to transmit a signal to a UE) and an uplink resource (i.e., a resource used by a UE to transmit a signal to a base station). For example, a frequency division duplex (FDD) scheme or a time division duplex (TDD) scheme can be applied. A usage of each resource can be configured as either downlink (DL) or uplink (UL). According to legacy LTE system, the usage is designated by system information.

Recently, as one of methods of improving LTE/LTE-A system, regarding the duplex operation, discussion on a method of dynamically designating DL-UL configuration is in progress.

DISCLOSURE OF THE INVENTION

Technical Task

Based on the aforementioned discussion, the present invention proposes a method of controlling uplink transmission power in a wireless communication system and an apparatus therefor in the following description.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of controlling uplink transmission power, which is controlled by a user equipment in a wireless communication system, includes the steps of transmitting an uplink signal according to an uplink-downlink configuration predetermined to a serving cell, receiving first transmission power control information on a first uplink subframe set and second transmission power control information on a second uplink subframe set from the serving cell and transmitting an uplink data channel (physical uplink shared channel (PUSCH)) in a specific subframe included in the second uplink subframe set according to the second transmission power control information. In this case, the second uplink subframe set includes at least one or more uplink subframes designated by higher layer signaling among a plurality of uplink subframes according to the predetermined uplink-downlink configuration.

Moreover, the second transmission power control information can include a value indicating a current PUSCH power control adjustment state for an index of the specific subframe.

Moreover, if information on the second uplink subframe set is received, the current PUSCH power control adjustment state can be reset.

Moreover, if information on the second uplink subframe set is received, the current PUSCH power control adjustment state can be set to 0.

Moreover, the first uplink subframe set may correspond to a subframe of which a usage of a radio resource is configured not to be changed and the second uplink subframe set may correspond to a subframe of which a usage of a radio resource is configured to be changed.

Moreover, the first uplink subframe set and the second uplink subframe set may be different from each other in an interference characteristic with a neighbor cell.

Moreover, the second uplink subframe set can be indicated by a usage change message.

Moreover, the specific subframe can be indicated by downlink control information in a DCI format 0/4.

To further achieve these and other advantages and in accordance with the purpose of the present invention, according to a different embodiment, a user equipment controlling uplink transmission power in a wireless communication system can include a radio frequency unit and a processor, the processor configured to transmit an uplink signal according to an uplink-downlink configuration predetermined to a serving cell, the processor configured to receive first transmission power control information on a first uplink subframe set and second transmission power control information on a second uplink subframe set from the serving cell, the processor configured to transmit an uplink data channel (physical uplink shared channel (PUSCH)) in a specific subframe included in the second uplink subframe set according to the second transmission power control information. In this case, the second uplink subframe set includes at least one or more uplink subframes designated by higher layer signaling among a plurality of uplink subframes according to the predetermined uplink-downlink configuration.

Advantageous Effects

According to embodiments of the present invention, a UE is able to efficiently control uplink transmission power in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

BEST MODE

Mode for Invention

Figure 1:
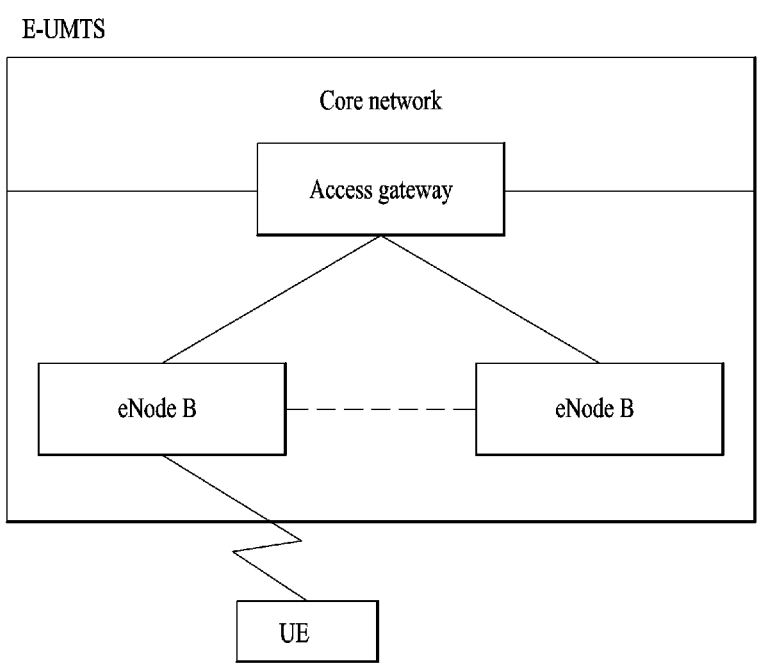
FIG. 1 is a schematic diagram of E-UMTS network structure as one example of a wireless communication system.

In the following, configuration, action and other characteristics of the present invention can be easily understood by embodiments of the present invention which are explained with reference to attached drawings. The embodiments explained in the following correspond to examples of which technological characteristics of the present invention are applied to 3GPP system.

In the present specification, although the embodiments of the present invention will be described based on the 3GPP LTE/LTE-A, the embodiments of the present invention can be applied to any communication system corresponding to the aforementioned definition. And, in the present specification, a name of a base station is used by a comprehensive terminology including an RRH (remote radio head), a TP (transmission point), an RP (reception point), an eNB, a relay and the like.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
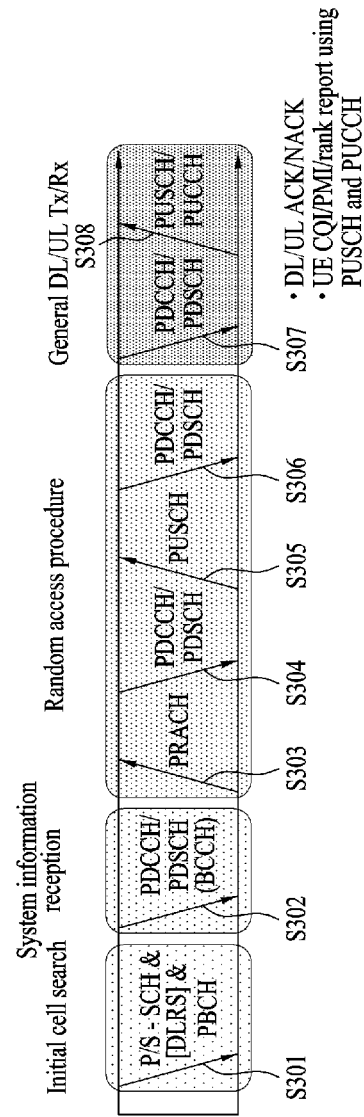
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the UE and a format of the DCI may vary according to a usage of the DCI.

Meanwhile, control information transmitted to a base station by a UE in UL or control information received from the base station by the UE includes DL/UL ACK/NACK signal, a CQI (channel quality indicator), a PMI (precoding matrix index), an RI (rank indicator), etc. in 3GPP LTE system, the UE can transmit the aforementioned control information such as the CQI/PMI/RI via the PUSCH and/or the PUCCH.

Figure 4:
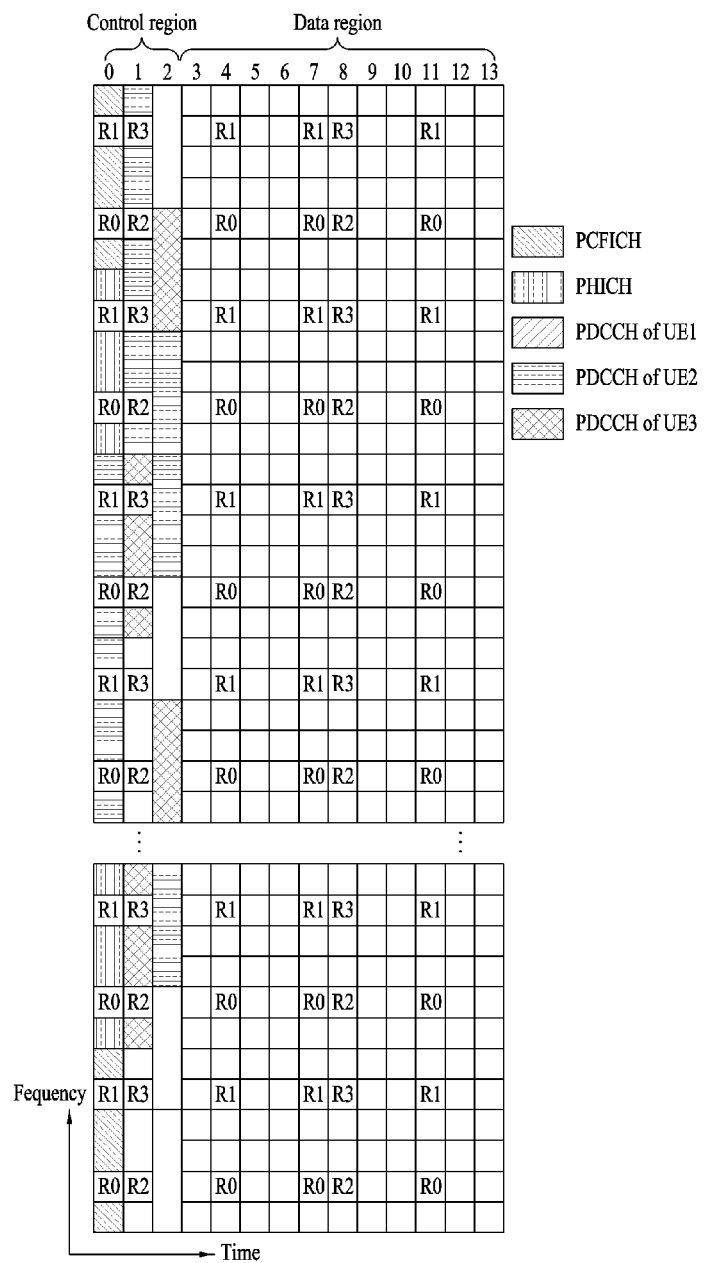
FIG. 4 is a diagram illustrating a structure of a downlink radio frame used in an LTE system.

FIG. 4 is a diagram for a control channel included in a control region of a subframe in a downlink radio frame.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 4, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 5:
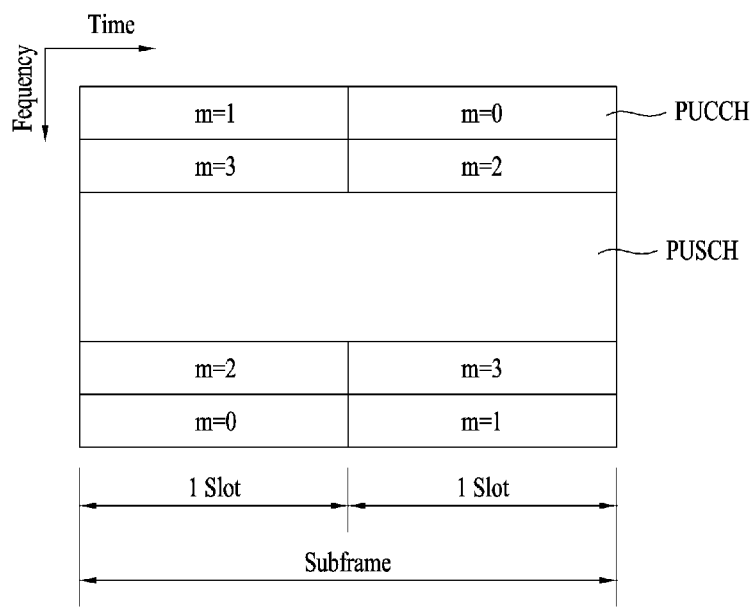
FIG. 5 is a diagram illustrating a structure of an uplink subframe used in an LTE system.

FIG. 5 illustrates a structure of a UL subframe in the LTE system.

Referring to FIG. 5, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 5.

Time for which a sounding reference signal is transmittable corresponds to a section at which a symbol positioned at the very last on a time axis is positioned in a subframe. A sounding reference signal is transmitted through a data transmission band on a frequency axis. Sounding reference signals of several user equipments, which are transmitted through the last symbol of an identical subframe, can be distinguished from each other according to a frequency position.

Figure 6:
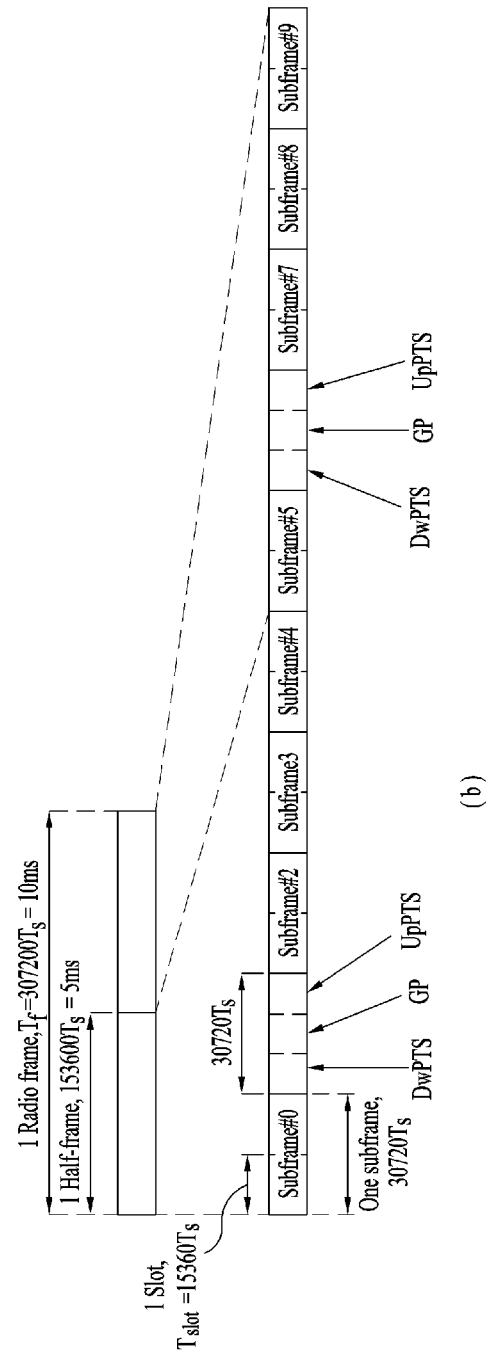
FIG. 6 is a diagram for an example of a structure of a radio frame in LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 1, D indicates a downlink subframe, U indicates an uplink subframe, and S means the special subframe. Also, the above Table 1 represents a downlink-uplink switching period of uplink/downlink subframe configuration in each system.

In the following description, a carrier aggregation scheme is explained. FIG. 12 is a conceptual diagram for explaining a carrier aggregation scheme.

A carrier aggregation means a technology using one big logical frequency band in a manner that a user equipment uses a frequency block configured with an uplink resource (or a component carrier) and/or a downlink resource (or a component carrier) or a plurality of cells (of logical meaning) in order for a wireless communication system to use a wider frequency band. For clarity, a terminology of 'component carrier' is consistently used in the following description.

Figure 7:
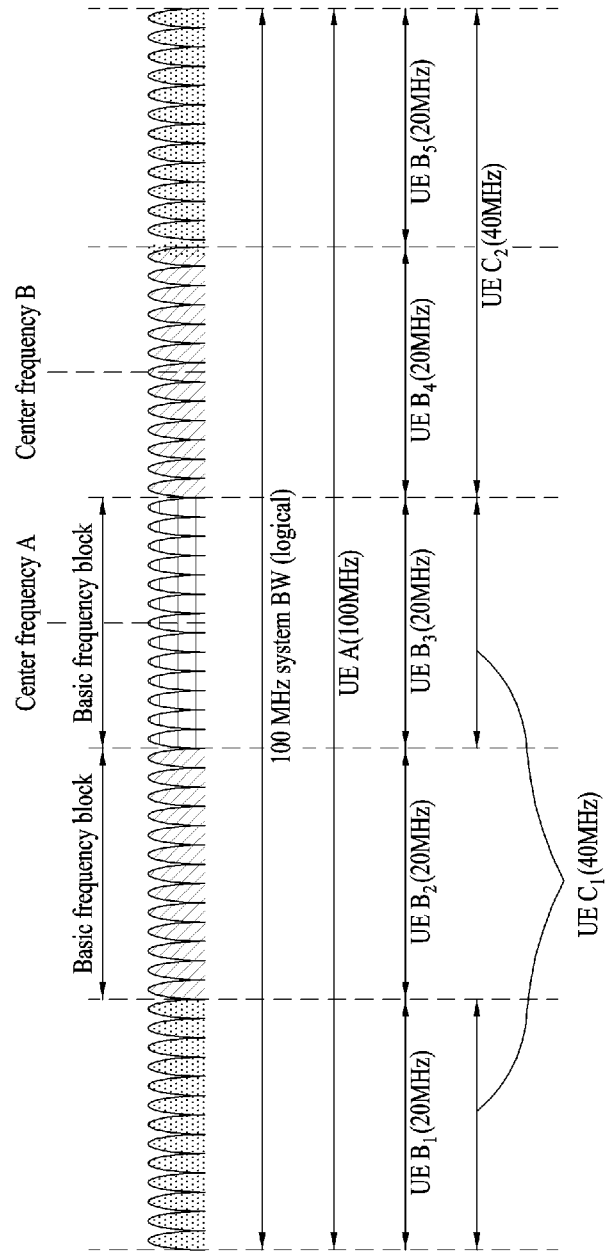
FIG. 7 is a conceptual diagram for explaining a carrier aggregation technique.

Referring to FIG. 7, a total system bandwidth (system BW) may have a system bandwidth up to maximum 100 MHz as a logical bandwidth. The total system bandwidth includes five component carriers and each of the component carriers may have up to maximum 20 MHz. The component carrier includes at least one physically contiguous subcarrier. Although each of the component carriers in FIG. 7 is depicted as including an identical bandwidth, this is exemplary only. Each of the component carriers may be able to have a bandwidth different from each other. And, although each of the component carriers is depicted as it is adjacent to each other in frequency domain, since the diagram is depicted in terms of a logical concept, each of the component carriers may be physically adjacent to each other or may be apart from each other.

A center frequency can be differently used for each of the component carriers or a common center frequency can be used for the component carriers physically adjacent to each other. As an example, in FIG. 7, if assumed that all component carriers are physically adjacent to each other, a center frequency 'A' can be used. Or, if assumed that each of the component carriers is not physically adjacent to each other, such a separate center frequency as a center frequency 'A', a center frequency 'B' or the like can be used for each of the component carriers.

In the present specification, a component carrier may correspond to a system bandwidth of a legacy system. By defining the component carrier on the basis of the legacy system, it may become easy to provide backward compatibility and to design a system in a radio communication environment in which an evolved UE and a legacy UE coexist. As an example, in case that LTE-A system supports a carrier aggregation, each of the component carriers may correspond to a system bandwidth of LTE system. In this case, the component carrier may have a prescribed bandwidth among the bandwidths of 1.25 MHz, 2.5 MHz, 5 MHz, 10 MHz, or 20 MHz.

In case that a total system bandwidth is expanded by a carrier aggregation, a frequency band used for communicating with each UE is defined by a component carrier unit. A UE A may use 100 MHz corresponding to the total system bandwidth and performs a communication in a manner of using all of the five component carriers. A UE $B_1 \sim B_5$ can use a bandwidth of 20 MHz only and performs a communication by using one component carrier. A UE $C_1$ and a UE $C_2$ can use a bandwidth of 40 MHz and performs a communication by using two component carriers, respectively. The two component carriers may or may not be logically/physically adjacent to each other. The UE $C_1$ indicates a case that the UE $C_1$ uses two component carriers not adjacent to each other and the UE $C_2$ indicates a case that the UE $C_2$ uses two component carriers adjacent to each other.

LTE system uses one DL component carrier and one UL component carrier. On the other hand, LTE-A system may use a plurality of component carriers as depicted in FIG. 6. In this case, a scheme of scheduling a data channel, which is scheduled by a control channel, can be divided into a conventional linked carrier scheduling scheme and a cross carrier scheduling scheme.

More specifically, in case of the linked carrier scheduling scheme, similar to a legacy LTE system using a single component carrier, a control channel transmitted on a specific component carrier schedules a data channel only via the specific component carrier.

Meanwhile, in case of the cross carrier scheduling scheme, a control channel transmitted on a primary component carrier (primary CC) schedules a data channel transmitted on the primary component carrier or a different component carrier using a carrier indicator field (hereinafter abbreviated CIF).

In the following, a method for controlling uplink transmission power in an LTE system is explained.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \text{[dBm]}$$ [Equation 1]

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \text{[dBm]}$$ [Equation 2]

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \epsilon \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

$\Delta_{TF}(i)$ indicates a value of a dynamic channel change compensated by a modulation and coding scheme (MCS) and is represented as $\Delta_{TF,c}(i)=10 \log_{10}((2^{BPRE \cdot K_s}-1) \cdot \beta_{offset}^{PUSCH})$.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$\delta_{PUSCH,c}$ is a correction value and is also referred to as a transmit power command (TPC) command. The $\delta_{PUSCH,c}$ can be signaled to the UE in a manner of being included in PDCCH/EPDCCH of DCI format 0/4 of the service cell c or in a manner of being joint coded with PDCCH of a DCI format 3/3A including a CRC parity bit scrambled by TPC-PUSCH-RNTI together with other TPC commands. If an accumulation mode is set to be activated based on a parameter 'Accumulation-Enabled' provided by the higher layer, or a TPC command included in PDCCH/EPDCCH of a DCI format 0 of the serving cell c scrambled by a temporary C-RNTI is included, a current PUSCH power control adjustment state of the serving cell c is defined as $f_c(i)=f_c(i-1)+\delta_{PUSCH,c}(i-K_{PUSCH})$.

In particular, $f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value. If accumulation is not enabled on the basis of the parameter provided by the higher layer, $f_c(i)=\delta_{PUSCH,c}(i-K_{PUSCH})$ is satisfied. In this case, $\delta_{PUSCH,c}(i-K_{PUSCH})$ is signaled by PDCCH/EPDCCH in a subframe $i-K_{PUSCH}$ together with DCI format 0/4.

$K_{PUSCH}$ is defined in LTE as follows.

For FDD (Frequency Division Duplex), $K_{PUSCH}$ has a value of 4. As to TDD, if TDD uplink/downlink configurations of at least two or more configured serving cells are not identical to each other, "TDD uplink/downlink configuration" of the serving cell c may refer to UL-reference UL/DL configuration.

In TDD, if one or more serving cells are set to a UE and TDD uplink/downlink configurations of at least two or more configured serving cells are not identical to each other, the TDD UL/DL configuration for the serving cell may refer to UL-reference UL/DL configuration.

In TDD, in case of UL/DL configuration 1 to 6, $K_{PUSCH}$ has values as shown in Table 2.

TABLE 2

| TDD UL/DL Configuration | subframe number i | | | | | | | | | |
|---|---|---|---|---|---|---|---|---|---|---|
|  | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In TDD, in case of UL/DL configuration 0, if PUSCH transmission is scheduled in a subframe 2 or 7 together with PDCCH/EPDCCH of a DCI format 0/4 where an LSB of an uplink index is set to 1, $K_{PUSCH}$ has a value of 7 and $K_{PUSCH}$ follows Table 2 for the rest of all PUSCH transmissions.

The UE attempts to decode a PDCCH/EPDCCH in DCI format 0/4 with C-RNTI thereof, decode a PDCCH/EPDCCH in DCI format 0 with SPS C-RNTI or decode a PDCCH in DCI format 3/3A with TPC-PUSCH-RNTI thereof in each subframe in cases other than deactivated state or DRX state of the serving cell c. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$, which is signaled together with DCI format 0/4 on a PDCCH, is shown in Table 3. When a PDCCH/EPDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

When $P_{O\_UE\_PUSCH,c}$ value is changed by the higher layer or a random access response message is received, the UE resets accumulation.

In this case, in case of an accumulative calculation type or a current non-accumulative (current absolute) calculation type, if the $P_{O\_UE\_PUSCH,c}$ value is changed by the higher layer and the serving cell c corresponds to a primary cell or if the $P_{O\_UE\_PUSCH,c}$ value is changed by the higher layer and the serving cell c corresponds to a secondary cell, an initial value of $f_c(*)$ is all set/reset/initialized by $f_c(0)=0$.

Moreover, in LTE system, regarding uplink power of PUSCH, it may refer to LTE/LTE-A standard document 3GPP TS 36.213 5.1.1 paragraph.

The following equation 3 is related to uplink power control with respect to a PUCCH in LTE.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [\text{dBm}]$$ [Equation 3]

In Equation 3, i indicates a subframe index and c indicates a cell index. When a UE is configured by a higher layer to transmit a PUCCH over through two antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) a value varying depending on a PUCCH format, $n_{CQI}$ is the number of information bits with respect to channel quality information (CQI) and $n_{HARQ}$ indicates the number of HARQ bits. In addition, $\Delta_{F\_PUCCH}$ (F) is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}$+$\delta_{msg2}$ otherwise. $\delta_{msg2}$ is a TPC command indicated in a random access response and $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2/3 | $\delta_{PUSCH,c}$ [dB] |
|---|---|
| 0 | −1 |
| 1 | 0 |
| 2 | 1 |
| 3 | 3 |

TABLE 6

| TPC Command Field in DCI format 3A | $\delta_{PUSCH,c}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min \begin{cases} P_{CMAX,c}(i) \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{cases} [dBm]$$

[Equation 4]

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by a higher layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment state for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

A sounding reference signal (SRS) is composed of constant amplitude zero auto correlation (CAZAC) sequences. SRSs transmitted from several UEs are CAZAC sequences ($r^{SRS}(n)=r_{u,v}^{(\alpha)}(n)$) having different cyclic shift values ($\alpha$) according to Equation 5 in the following.

$$\alpha = 2\pi \frac{n_{SRS}^{cs}}{8}$$

[Equation 5]

In this case, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases}$$

[Equation 6]

In this case, $k_0$ denotes a frequency domain start point of an SRS and is defined by Equation 7.

$$k_0 = k'_0 + \sum_{b=0}^{B_{SRS}} 2M_{sc,b}^{RS} n_b$$

[Equation 7]

where, $n_b$ denotes a frequency location index. $k'_0$ for a general uplink subframe is defined by Equation 8 and $k'_0$ for an uplink pilot time is defined by Equation 9.

$$k_0' = (\lfloor N_{RB}^{UL}/2 \rfloor - m_{SRS,0}/2) N_{SC}^{RB} + k_{TC}$$

[Equation 8]

$$k_0' = \begin{cases} (N_{RB}^{UL} - m_{SRS,0}^{max})N_{sc}^{RB} + k_{TC} & \text{if } ((n_f \bmod 2) \times (2 - N_{SP}) + n_{hf}) \bmod 2 = 0 \\ k_{TC} & \text{otherwise} \end{cases}$$ [Equation 9]

In Equations 8 and 9, $k_{TC}$ denotes a transmissionComb parameter signaled to a UE via a higher layer and has a value of 0 or 1. In addition, $n_{hf}$ is 0 in an uplink pilot time slot of a first half frame and is 0 in an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2$$ [Equation 10]

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b$$ [Equation 11]

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$ [Equation 12]

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases}$$ [Equation 13]

where, $n_{SRS}$ is a parameter used to calculate the number of times of transmitting the SRS and is defined by Equation 14.

$$n_{SRS} = \begin{cases} 2N_{SP}n_f + 2(N_{SP} - 1)\lfloor \frac{n_s}{10} \rfloor + \lfloor \frac{T_{offset}}{T_{offset\_max}} \rfloor, & \text{for 2ms SRS periodicity of TDD frame structure} \\ \lfloor (n_f \times 10 + \lfloor n_s/2 \rfloor)/T_{SRS} \rfloor, & \text{otherwise} \end{cases}$$ [Equation 14]

In Equation 14, $T_{SRS}$ denotes the periodicity of an SRS and $T_{offset}$ denotes a subframe offset of an SRS. In addition, $n_s$ denotes a slot number and $n_f$ denotes a frame number.

An SRS configuration index $I_{SRS}$ for setting the periodicity $T_{SRS}$ and the subframe offset $T_{offset}$ of the SRS is shown in Table 7 to Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-36 | 20 | $I_{SRS}-17$ |
| 37-76 | 40 | $I_{SRS}-37$ |
| 77-156 | 80 | $I_{SRS}-77$ |
| 157-316 | 160 | $I_{SRS}-157$ |
| 317-636 | 320 | $I_{SRS}-317$ |
| 637-1023 | reserved | reserved |

TABLE 8

| Configuration Index $I_{SRS}$ | SRS Periodicity $T_{SRS}$ (ms) | SRS Sub frame Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}-10$ |
| 15-24 | 10 | $I_{SRS}-15$ |
| 25-44 | 20 | $I_{SRS}-25$ |
| 45-84 | 40 | $I_{SRS}-45$ |
| 85-164 | 80 | $I_{SRS}-85$ |
| 165-324 | 160 | $I_{SRS}-165$ |
| 325-644 | 320 | $I_{SRS}-325$ |
| 645-1023 | reserved | reserved |

Table 9 and Table 10 in the following show a period related to a triggering type 1, i.e., an aperiodic SRS, and offset information. In particular, Table 9 and Table 10 indicate a FDD system and a TDD system, respectively.

TABLE 9

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-31 | reserved | reserved |

TABLE 10

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |

TABLE 10-continued

| SRS Configuration Index $I_{SRS}$ | SRS Periodicity $T_{SRS,1}$ (ms) | SRS Subframe Offset $T_{offset,1}$ |
|---|---|---|
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

According to a recent wireless communication system, when an eNB performs a duplex operation in a manner of dividing all available resources into downlink resources and uplink resources, discussion on a technology for more flexibly changing an operation of selecting a usage of each resource as a downlink resource or an uplink resource is in progress.

The aforementioned method for flexibly changing usage of resources has the advantage that optimized resource distribution can be performed when sizes of DL traffic and UL traffic are flexibly varied. For example, In operations of an FDD system using frequency bands divided into a DL band and a UL band, an eNB can designate a specific band to a DL resource or a UL resource at a specific time through an RRC, MAC or physical layer signal for flexible resource usage change.

In particular, a TDD system partitions all subframes into UL subframes and DL subframes and uses the UL subframes and DL subframes for UL transmission of UEs and DL transmission of an eNB. Such UL/DL configuration is signaled to a UE as part of system information, in general. Of course, it is able to additionally provide a new UL/DL subframe configuration to a UE as well as the UL-DL subframe configurations shown in Table 1. For dynamic resource usage change in the TDD system, the eNB can designate a specific subframe to a DL resource or a UL resource at a specific time through an RRC, MAC or physical layer signal.

In legacy LTE systems, a DL resource and a UL resource are designated through system information. Since the system information needs to be transmitted to a plurality of unspecified UEs, operations of legacy UEs may have problems when the system information is dynamically changed. Accordingly, it is desirable to transmit information on dynamic resource usage change to UEs currently linked to an eNB through new signaling, particularly, UE-specific signaling, rather than the system information. Such new signaling may indicate a configuration of a dynamically changed resource, for example, uplink/downlink subframe configuration information different from a configuration indicated through system information in a TDD system.

In addition, such new signaling may include information related to HARQ. Particularly, the new signaling may include a scheduling message and PDSCH/PUSCH transmission timing corresponding thereto, and HARQ timeline configuration information for maintaining stable HARQ timeline even if resource configuration is dynamically changed so as to solve a problem that HARQ timeline, defined as HARQ-ACK transmission timeline, does not continue when the HARQ timeline is dynamically changed. In the case of a TDD system, the HARQ timeline configuration information can be provided as an uplink/downlink subframe configuration that is referred to when downlink HARQ timeline and/or uplink HARQ timeline are defined.

As described above, a UE linked to a system that dynamically changes usage of resources receives various information about a resource configuration. In particular, in case of a TDD system, a UE can acquire the following information at a specific time.

1) UL/DL subframe configuration indicated by system information

2) UL/DL subframe configuration transmitted in order to indicate usage of each subframe through additional signaling 3) UL/DL configuration transmitted to define DL HARQ timeline, that is, when HARQ-ACK for a PDSCH received at a specific time will be transmitted 4) UL/DL subframe configuration transmitted to define UL HARQ timeline, that is, when a PUSCH for a UL grant received at a specific time will be transmitted and when a PHICH for a PUSCH transmitted at a specific time will be received When a specific UE is linked to an eNB that dynamically changes usage of resources, the eNB may operate to set a UL/DL subframe configuration including as many UL SFs as possible through system information in many cases. This is because dynamic change of subframes, which are designated as DL SFs through the system information, to UL SFs may be restricted. Specifically, since legacy UEs which cannot recognize dynamic resource usage change expect and measure CRS transmission in subframes, which are designated as DL subframes through system information, all the time, serious error can be generated in CRS measurement of the legacy UEs when the DL subframes are dynamically changed to UL subframes. Accordingly, it is desirable that the eNB dynamically changes some UL SFs to DL SFs when DL traffic increases while configuring a larger number of UL SFs on the system information.

In a TDD system operating according to the aforementioned principle, although UL/DL configuration #0 is signaled to a UE through system information at a specific time, usage of resources in each subframe may conform to UL/DL subframe configuration #1.

In addition, DL HARQ timeline may be based on UL/DL subframe configuration #2. This is because HARQ timeline can be maintained even if UL/DL subframe configurations are dynamically changed when HARQ timeline is based on a UL/DL subframe configuration including a smaller number of UL SFs and a larger number of DL SFs such that the number of DL SFs reaches a maximum number to cause a situation in which HARQ-ACK is difficult to transmit and DL HARQ timeline is operated in this situation. Similarly, UL HARQ timeline may be based on a UL/DL subframe configuration including a larger number of UL SFs, such as UL/DL subframe configuration #0.

Meanwhile, as mentioned in the foregoing description, UL transmission power control of a UE includes open loop power control (OLPC) and closed loop power control (CLPC). The former controls power in such a manner that attenuation of a downlink signal from an eNB (serving eNB, S-eNB) of a cell to which the UE belongs is estimated and compensated for. For example, OLPC controls uplink power by increasing uplink transmission power when downlink signal attenuation increases as a distance between the UE and the eNB increases. The latter controls uplink power in such a manner that the eNB directly transmits information (i.e. a control signal) necessary for the eNB to control uplink transmission power.

However, these conventional uplink power control methods do not consider a UE linked to an eNB that dynamically changes usage of resources. When the conventional power control methods are used although specific UL transmission is carried out in a UL SF to which dynamic resource usage change is applied, UL transmission performance may be seriously deteriorated since interference environments are remarkably changed due to DL transmission of a neighboring cell and the like.

Hence, a recent LTE system considers a method of designating a plurality of subframe sets and applying different power control methods to respective subframe sets. Information on a plurality of the subframe sets may be provided to UEs through higher layer signaling such as RRC signaling, provided in associated with specific subframe set information used for other purposes, or independently RRC-signaled.

For convenience of description, it is assumed that two subframe sets are signaled. In this case, each of the two subframe sets is respectively referred to as a subframe set #1 and a subframe set #2. The subframe set #1 and the subframe set #2 can be defined as L-bit subframe bitmaps. In particular, the subframe set #1 and the subframe set #2 may correspond to a static SF and a flexible SF, respectively.

Figure 8:
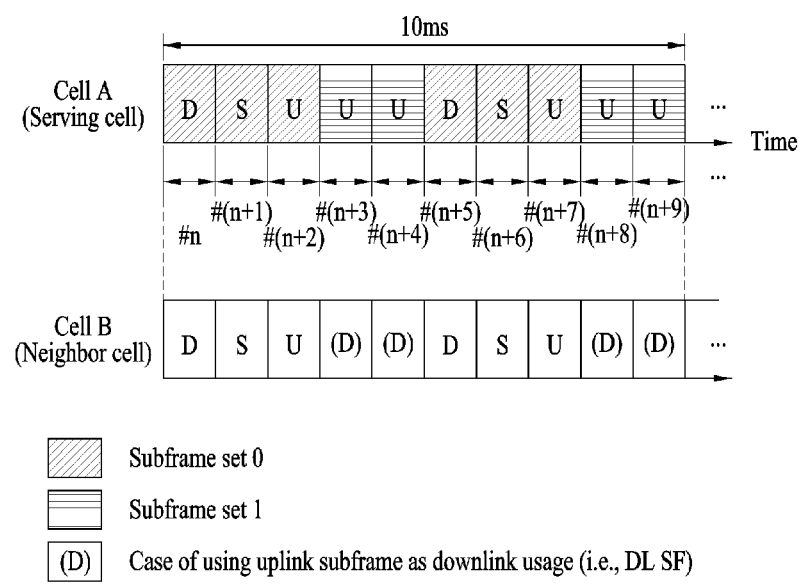
FIG. 8 is a diagram for an example of dividing a radio frame into a subframe set #1 and a subframe set #2 according to a change of a usage of a radio resource.

FIG. 8 is a diagram for an example of dividing a radio frame into a subframe set #1 and a subframe set #2.

Referring to FIG. 8, a static subframe may correspond to legacy subframe to which a dynamic resource usage change is not applied. And, a flexible subframe may correspond to a subframe to which the dynamic resource usage change is applied or capable of being applied. In particular, unlike the static subframe, since interference environment can be considerably changed in the flexible subframe when a UE performs uplink transmission, it may be preferable to apply a separate power control scheme to the flexible subframe.

In particular, referring to an example of FIG. 8, in a state that both a cell A (serving cell) and a cell B (neighbor cell) configure an uplink/downlink subframe configuration #0 (i.e., DSUUUDSUUU) through system information, the cell B changes a usage of #(n+3), #(n+4), #(n+8) and #(n+9) subframes into downlink subframes.

In this case, as shown in FIG. 8, the cell A sets a subframe set #1 and a subframe set #2 to UE(s) belonging to the cell A and may be able to apply a different power control scheme according to each subframe set. In particular, if inter-cell cooperation is available, neighbor cells are able to appropriately configure subframe sets in consideration of the inter-cell cooperation when a specific cell applies a dynamic resource usage change. Or, if it is regulated as the prescribed subframe set configurations are applied only between cells in advance, the dynamic resource usage change can be applied to a specific subframe set (e.g., a subframe set #2 in FIG. 8) only.

Specifically, if legacy PUSCH PC in a specific subframe set (e.g., a subframe set #2 which is a flexible subframe) is applied to a different specific subframe set (e.g., a subframe set #1 which is a static subframe) as it is, performance degradation may occur due to a big interference environment difference according to a subframe set. Hence, it is preferable to apply a PUSCH power control process which is separated from each other according to each subframe set.

Based on the aforementioned contents, the present invention proposes a method of efficiently controlling/managing transmission power of an uplink data information channel (PUSCH)/uplink control information channel (PUCCH) of a UE when a plurality of cells dynamically change a usage of a radio resource according to a system load state of the cells.

In the following, for clarity, the present invention is explained based on 3GPP LTE system. However, a system range to which the present invention is applied can also be extended to a different system rather than the 3GPP LTE system.

Moreover, embodiments of the present invention can also be extensively applied to a case that a resource on a specific cell or a component carrier (CC) is dynamically changed according to a load state of a system under environment to which a carrier aggregation (CA) scheme is applied.

And, the embodiments of the present invention can also be extensively applied to a case that a usage of a radio resource is dynamically changed in a TDD system or a FDD system. In the following description, for clarity, assume a situation that each of the cells dynamically changes a usage of a legacy radio resource according to a system load state of the cell under TDD system environment.

According to the aforementioned contents, an open-loop parameter (open-loop control parameter) corresponds to $P_{O\_PUSCH,c}(j)$ and $\alpha_c(j)$ and a closed loop parameter (closed-loop control parameter) corresponds to $f_c(i)$ and $\Delta_{TF,c}(i)$. And, as an example, it is able to know that the power control of the legacy uplink data channel is determined by an accumulative calculation mode (accumulative TPC command) or a non-accumulative calculation mode (absolute TPC command) of a closed-loop parameter (i.e., $f_c(i)$) which is received according to "Accumulation-enabled" configuration (corresponding to a higher layer signal-related parameter).

In particular, when transmission power of an uplink data channel (PUSCH) transmitted at a specific subframe timing (i.e., SF #i) is determined, if the transmission power of the uplink data channel already reaches a maximum transmission power value (i.e., $P_{CMAX,c}(i)$) of a UE, a rule is defined as closed-loop parameters (i.e., $\delta_{PUSCH,c}(i-K_{PUSCH})$) (or TPC (Transmission Power Control) Commands) of a previously received positive value as well as timing of receiving scheduling information (UL grant) interlocked with uplink data channel transmission of the specific subframe timing (i.e., SF #i) are not accumulatively calculated. As a different example, when transmission power of an uplink data channel (PUSCH) transmitted at a specific subframe timing (i.e., SF #i) is determined, if the transmission power of the uplink data channel already reaches a minimum transmission power value of a UE, a rule is defined as closed-loop parameters (i.e., $\delta_{PUSCH,c}(i-K_{PUSCH})$) (or TPC (Transmission Power Control) Commands) of a previously received negative value as well as timing of receiving scheduling information (UL grant) interlocked with uplink data channel transmission of the specific subframe timing (i.e., SF #i) are not accumulatively calculated.

Moreover, as mentioned in the foregoing description, dynamic power control of an uplink data channel (PUSCH) is performed based on a TPC field of a DCI format 0/4 or a TPC field of a DCI format 3/3A received at (predefined) subframe timings on which uplink scheduling information (UL grant) is received in TDD system.

When a neighbor cell dynamically changes a usage of a radio resource, a different type of interference is received in an uplink subframe of random timing (i.e., SF #n) of a specific cell (e.g., serving cell) depending on a usage of a subframe used by the neighbor cell at the timing.

For example, if the neighbor cell uses the subframe of the timing (i.e., SF #n) in a manner of (re)changing a usage of the subframe into a downlink usage, downlink interference (hereinafter, I_DU) is received in an uplink subframe of the identical timing (i.e., SF #n) of the specific cell. In this case, the uplink subframe of the identical timing of the specific cell has a relatively high IoT property. On the contrary, if the neighbor cell uses the subframe of the timing (i.e., SF #n) in a manner of (re)changing a usage of the subframe into an uplink usage, uplink interference (hereinafter, I_UU) is received in an uplink subframe of the identical timing (i.e., SF #n) of the specific cell (in this case, the uplink subframe of the identical timing of the specific cell has a relatively low IoT property).

Hence, the specific cell (e.g., serving cell) can configure "subframe-dependent uplink power control (hereinafter, SD_PC)" operation in consideration of subframe sets including a different interference characteristic (i.e., I_DU, I_UU). In this case, the SD_PC includes i) an operation of configuring an independent (different) open-loop power control parameter (OLPC) parameter (e.g., Po (i.e., A semi-static base level), α (i.e., An open-loop path-loss compensation component)) according to a subframe set including a different interference characteristic and/or ii) an operation of separating accumulation of a closed-loop power control parameter (CLPC) Parameter (e.g., Accumulative TPC command, Absolute TPC command, A component dependent on the MCS) according to a subframe set including a different interference characteristic. Moreover, if the SD_PC operation is set, the specific cell can secure stable uplink communication or uplink communication of identical quality irrespective of uplink subframes of which interference characteristic is different from each other.

A specific cell (serving cell) sets (signals) a subframe-dependent uplink power control mode (hereinafter, SD_PC mode) to a UE (serving UE) performing uplink communication with the specific cell. This is because interference characteristics (i.e., I_DU, I_UU) different from each other occur according to an uplink subframe set of the specific cell when a neighbor cell dynamically changes a usage of a radio resource. In other word, in terms of the specific cell, whether to set (signal) the SD_PC mode may vary according to a change of external interference (e.g., whether or not a neighbor cell performing a dynamic change of a radio resource usage exists).

And, in terms of a UE, the number of uplink subframes to which an independent uplink power control process (UL PC process) is applied may vary according to whether or not the SD_PC mode is set (signaled) to the UE. In this case, if the SD_PC mode is not set, all uplink subframes are considered as a single set and a single UL PC process identical to a legacy process can be applied. On the contrary, if the SD_PC mode is set, maximum two uplink subframe sets exist according to uplink power control subframe set (UL PC SF SET) configuration information signaled by a specific cell and an independent UL PC process can be applied according to each uplink subframe set.

In the following, a method for a UE to which an SD_PC mode is set to efficiently reflect (inherit) an accumulation value of an uplink communication-related closed-loop power control (CLPC) parameter (e.g., $f_c(i)$) before the SD_PC mode is set (i.e., non-SD_PC mode) or a method of efficiently reflecting (inheriting) an accumulation value of a previous (i.e., in case of setting the number of uplink subframe sets to 1) uplink communication-related closed-loop power control (CLPC) parameter (e.g., $f_c(i)$) when the number of uplink subframe sets is changed (signaled) to 2 from 1 in a state that the SD_PC mode is set is explained. In particular, when a serving cell c sets a parameter for two uplink subframe sets to a UE, a value of a PUSCH power control adjustment state is explained in the following.

In the following, for clarity, when the SD_PC mode is set or when the number of uplink subframe sets is set to 2 in the SD_PC mode, an uplink subframe set including an interference characteristic of I_UU is referred to as "SD_PC_SET0" (e.g., sort of static UL SF set) and an uplink subframe set including an interference characteristic of I_DU is referred to as "SD_PC_SET1" (e.g., sort of flexible UL SF set).

And, the embodiments of the present invention described in the following can be configured to be restrictively applied only when accumulation of a closed-loop power control parameter (e.g., $f_c(i)$) is separated from each other according to an uplink subframe set (e.g., SD_PC_SET0, SD_PC_SET1), which is formed due to the SD_PC mode or due to the configuration of the number of uplink subframe sets configured by two in the SD_PC mode. Moreover, a state of which the SD_PC mode is not set may operate in a manner of being identical to a case of designating one uplink subframe set only in a state that the SD_PC mode is set in terms of an uplink power control operation. Hence, the embodiments of the present invention described in the following can also be extensively applied to i) a case that the number of uplink subframe sets is changed to 2 from 1 and ii) a case that the number of uplink subframe sets is signaled to 2 from 1 in the state that the SD_PC mode is set.

Embodiment 1

According to embodiment 1 of the present invention, before the SD_PC mode is set or when the number of uplink subframes is set to 1 in the SD_PC mode, an accumulation value of an uplink communication-related closed-loop power control parameter (e.g., $F_c(i)$) can be configured not to be reflected (inherited) to SD_PC_SET0 and SD_PC_SET1, which are formed due to configuration of the SD_PC mode or due to the change of the number of uplink subframe sets, which is changed to 2 in the SD_PC mode.

In particular, according to the embodiment 1 of the present invention, before the SD_PC mode is set, the accumulation value of the uplink communication-related closed-loop power control parameter (e.g., $f_c(i)$) can be initialized or reset. And, when the number of uplink subframes is set to 1 in the SD_PC mode, if the number of uplink subframe sets is changed to 2 in the SD_PC mode, the accumulation value of the uplink communication-related closed-loop power control parameter can be initialized or reset.

Embodiment 2

According to embodiment 2 of the present invention, before the SD_PC mode is set or when the number of uplink subframes is set to 1 in the SD_PC mode, an accumulation value of an uplink communication-related closed-loop power control parameter (e.g., $F_c(i)$) can be configured to be reflected (inherited) to SD_PC_SET0 (i.e., uplink subframe set having an interference characteristic of I-UU) only, which is formed due to configuration of the SD_PC mode or due to the change of the number of uplink subframe sets, which is changed to 2 in the SD_PC mode.

In particular, in terms of SD_PC_SET1 (i.e., uplink subframe set having an interference characteristic of I-DU), which is formed due to configuration of the SD_PC mode or due to the change of the number of uplink subframe sets which is changed to 2 in the SD_PC mode, before the SD_PC mode is set or when the number of uplink subframes is set to 1 in the SD_PC mode, the accumulation value of the uplink communication-related closed-loop power control parameter (e.g., $f_c(i)$) can be initialized or reset (e.g., 0) due to the SD_PC mode configuration or due to the change of the number of uplink subframe sets, which is changed to 2 in the SD_PC mode.

Moreover, before the SD_PC mode is set or when the number of uplink subframes is set to 1 in the SD_PC mode, if the accumulation value of the uplink communication-related closed-loop power control parameter is reflected (inherited) to the SD_PC_set0, which is formed due to configuration of the SD_PC mode or due to the change of the number of uplink subframe sets which is changed to 2 in the SD_PC mode, it is able to configure a result value by which a predefined (signaled) weight is multiplied to be reflected (or inherited) to the SD_PC_SET0.

As a different example, before the SD_PC mode is set or when the number of uplink subframes is set to 1 in the SD_PC mode, an accumulation value of an uplink communication-related closed-loop power control parameter (e.g., $F_c(i)$) can be configured to be reflected (inherited) to SD_PC_SET1 (i.e., uplink subframe set having an interference characteristic of I-DU) only, which is formed due to configuration of the SD_PC mode or due to the change of the number of uplink subframe sets, which is changed to 2 in the SD_PC mode.

Moreover, before the SD_PC mode is set or when the number of uplink subframes is set to 1 in the SD_PC mode, if the accumulation value of the uplink communication-related closed-loop power control parameter is reflected (inherited) to the SD_PC_SET1, which is formed due to configuration of the SD_PC mode or due to the change of the number of uplink subframe sets which is changed to 2 in the SD_PC mode, it is able to configure a result value by which a predefined (signaled) weight is multiplied to be reflected (or inherited) to the SD_PC_SET1.

Embodiment 3

According to embodiment 3 of the present invention, before the SD_PC mode is set or when the number of uplink subframes is set to 1 in the SD_PC mode, an accumulation value of an uplink communication-related closed-loop power control parameter (e.g., $F_c(i)$) can be configured to be reflected (inherited) to both SD_PC_SET0 and SD_PC_SET1, which are formed due to configuration of the SD_PC mode or due to the change of the number of uplink subframe sets, which is changed to 2 in the SD_PC mode.

In this case, before the SD_PC mode is set or when the number of uplink subframes is set to 1 in the SD_PC mode, if the accumulation value of the uplink communication-related closed-loop power control parameter is reflected (inherited) to both the SD_PC_SET0 and the SD_PC_SET1, which are formed due to configuration of the SD_PC mode or due to the change of the number of uplink subframe sets which is changed to 2 in the SD_PC mode, it is able to configure result values by which i) predefined (signaled) weights different from each other or ii) predefined weights identical to each other are multiplied to be reflected (or inherited) according to an uplink subframe set (i.e., SD_PC_SET0, SD_PC_SET1) including a different interference characteristic.

Embodiment 4

According to embodiment 4 of the present invention, before the SD_PC mode is set or when the number of uplink subframes is set to 1 in the SD_PC mode, an accumulation value of an uplink communication-related closed-loop power control parameter (e.g., $F_c(i)$) can be configured to be restrictively reflected (inherited) to SD_PC_SET0 (i.e., uplink subframe set having an interference characteristic of I-UU) only, which is formed due to configuration of the SD_PC mode or due to the change of the number of uplink subframe sets which is changed to 2 in the SD_PC mode, only when a part (or all) of open-loop (OLCP) parameters (e.g., $P_{O\_UE\_PUSCH,c}$, $P_{O\_NOMINAL\_PUSCH,c}$, $\alpha_c$) related to the SD_PC_SET0 is identically maintained with values of before the SD_PC mode is set or values of when the number of uplink subframes is set to 1 in the SD_PC mode.

As a different example, before the SD_PC mode is set or when the number of uplink subframes is set to 1 in the SD_PC mode), an accumulation value of an uplink communication-related closed-loop power control parameter (e.g., $F_c(i)$) can be configured to be restrictively reflected (inherited) to SD_PC_SET1 (i.e., uplink subframe set having an interference characteristic of I-DU) only, which is formed due to configuration of the SD_PC mode or due to the change of the number of uplink subframe sets which is changed to 2 in the SD_PC mode, only when a part (or all) of open-loop (OLCP) parameters (e.g., $P_{O\_UE\_PUSCH,c}$, $P_{O\_NOMINAL\_PUSCH,c}$, $\alpha_c$) related to the SD_PC_SET1 is identically maintained with values of before the SD_PC mode is set or values of when the number of uplink subframes is set to 1 in the SD_PC mode.

Embodiment 5

According to embodiment 5 of the present invention, before the SD_PC mode is set (or when the number of uplink subframes is set to 1 in the SD_PC mode), an accumulation value of an uplink communication-related closed-loop power control parameter (e.g., $F_c(i)$) can be configured to be reflected (inherited) to an uplink subframe set having a lowest or a relatively low subframe set index (e.g., 0) only among uplink subframe sets of which interference characteristic is different from each other, which are formed due to configuration of the SD_PC mode or due to the change of the number of uplink subframe sets which is changed to 2 in the SD_PC mode. In this case, as an example, it is able to configure a lowest subframe set index (e.g., 0) to be assigned to an uplink subframe set having an interference characteristic of I_UU or an uplink subframe set having an interference characteristic of I_DU.

As a different example, before the SD_PC mode is set or when the number of uplink subframes is set to 1 in the SD_PC mode, an accumulation value of an uplink communication-related closed-loop power control parameter (e.g., $F_c(i)$) can be configured to be reflected (inherited) to an uplink subframe set having a highest or a relatively high subframe set index (e.g., 1) only among uplink subframe sets of which interference characteristic is different from each other, which are formed due to configuration of the SD_PC mode or due to the change of the number of uplink subframe sets which is changed to 2 in the SD_PC mode. In this case, as an example, it is able to configure a highest subframe set index (e.g., 1) to be assigned to an uplink subframe set having an interference characteristic of I_UU or an uplink subframe set having an interference characteristic of I_DU.

Embodiment 6

According to embodiment 6 of the present invention, before the SD_PC mode is set or when the number of uplink subframes is set to 1 in the SD_PC mode, it is able to configure a base station (or a cell) to inform (signal) a UE of i) an uplink subframe set index or ii) a UL PC process index (i.e., a specific UL PC process index is interlocked with a specific uplink subframe set index) to which an accumulation value of an uplink communication-related closed-loop power control parameter (e.g., $F_c(i)$) is inherited (reflected).

In this case, it is able to configure the information according to the embodiment 6 of the present invention to be transmitted in a manner of being included in a usage change message (reconfiguration message) (transmitted based on a predetermined period) or it is able to configure the information to be transmitted via a predefined (additional) signal (e.g., a higher layer signal or a physical layer signal).

A proposed scheme described in the following corresponds to a method of efficiently reflecting (inheriting) an accumulation value of a specific uplink subframe set (e.g., SD_PC_SET1 and/or SD_PC_SET2)-related closed-loop power control (CLPC) parameter (e.g., $f_{SD\_PC\_SET0,c}(i)$, $f_{SD\_PC\_SET1,c}(i)$) when a UE to which an SD_PC mode is set is disabled from the SD_PC mode or a method of efficiently reflecting (inheriting) an accumulation value of a specific uplink subframe set (e.g., SD_PC_SET1 and/or SD_PC_SET2)-related closed-loop power control (CLPC) parameter (e.g., $f_{SD\_PC\_SET0,c}(i)$, $f_{SD\_PC\_SET1,c}(i)$) of which the number of uplink subframe sets is set to 2 when the number of uplink subframe sets is changed (signaled) to 1 from 2 in a state that the SD_PC mode is set.

And, embodiments described in the following can be configured to be restrictively applied only when accumulation of a closed-loop power control parameter (e.g., $f_c(i)$) is separated according to an uplink subframe set (e.g., SD_PC_SET0, SD_PC_SET1) which is formed due to SD_PC mode configuration or due to the configuration of the uplink subframe sets set to 2 in the SD_PC mode. Moreover, if the SD_PC mode is disabled, it can be considered as being identical to a case of changing (signaling) the number of uplink subframe sets into 1 from 2 in terms of an uplink power control operation in a state that the SD_PC mode is set. Hence, the embodiments of the present invention described in the following can be extensively applied to i) a case that the number of uplink subframe sets is changed to 1 from 2 or ii) a case that the number of uplink subframe sets is signaled to 1 from 2 when the SD_PC mode is set.

Embodiment 7

According to embodiment 7 of the present invention, it is able to configure all accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1, which are formed due to SD_PC mode configuration or due to the configuration of the number of uplink subframe sets set to 2 in the SD_PC mode, not to be reflected (inherited).

In particular, according to the embodiment 7 of the present invention, the accumulation values of the closed-loop power control parameter (e.g., $f_{SD\_PC\_SET0,c}(i)$, $f_{SD\_PC\_SET1,c}(i)$) related to the SD_PC_SET0 and the SD_PC_SET1, which are formed due to the SD_PC mode configuration or due to the configuration of the number of uplink subframe sets set to 2 in the SD_PC mode, can be initialized or reset by disabling the SD_PC mode or can be initialized or reset by changing the number of uplink subframe sets to 1 in the SD_PC mode.

Embodiment 8

According to embodiment 8 of the present invention, it is able to configure an accumulation value of a closed-loop power control parameter (e.g., $f_{SD\_PC\_SET0,c}(i)$) related to SD_PC_SET0, which is formed due to SD_PC mode configuration or due to the configuration of the number of uplink subframe sets set to 2 in the SD_PC mode, to be reflected (inherited) only.

In particular, the accumulation value of the closed-loop power control parameter (e.g., $f_{SD\_PC\_SET0,c}(i)$) related to the SD_PC_SET1, which is formed due to the SD_PC mode configuration or due to the configuration of the number of uplink subframe sets set to 2 in the SD_PC mode, can be initialized or reset by disabling the SD_PC mode or can be initialized or reset by changing the number of uplink subframe sets to 1 in the SD_PC mode. Moreover, when an accumulation value of a closed-loop power control parameter (e.g., $f_{SD\_PC\_SET0,c}(i)$) related to SD_PC_SET0, which is formed due to SD_PC mode configuration or due to the configuration of the number of uplink subframe sets set to 2 in the SD_PC mode, is reflected (inherited) only, it is able to configure a result value by which a predefined (signaled) weight is multiplied to be reflected (inherited).

As a different example, it is able to configure an accumulation value of a closed-loop power control parameter (e.g., $f_{SD\_PC\_SET1,c}(i)$) related to SD_PC_SET1, which is formed due to SD_PC mode configuration or due to the configuration of the number of uplink subframe sets set to 2 in the SD_PC mode, to be reflected (inherited) only. Moreover, when the accumulation value of the closed-loop power control parameter (e.g., $f_{SD\_PC\_SET1,c}(i)$) related to SD_PC_SET1, which is formed due to SD_PC mode configuration or due to the configuration of the number of uplink subframe sets set to 2 in the SD_PC mode, is reflected (inherited) only, it is able to configure a result value by which a predefined (signaled) weight is multiplied to be reflected (inherited).

Embodiment 9

According to embodiment 9 of the present invention, it is able to configure accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1, which are formed due to SD_PC mode configuration or due to the configuration of the number of uplink subframe sets set to 2 in the SD_PC mode, to be proportionally reflected (inherited) based on a predefined configuration/rule/function.

In this case, it is able to configure i) an arithmetic/geometric/weighted average value, ii) a minimum value, or iii) a maximum value of the accumulation values of the closed-loop power control parameter (e.g., $f_{SD\_PC\_SET0,c}(i)$, $f_{SD\_PC\_SET1,c}(i)$) related to the SD_PC_SET0 and the SD_PC_SET1, which are formed due to the SD_PC mode configuration or due to the configuration of the number of uplink subframe sets set to 2 in the SD_PC mode, to be reflected (inherited).

Embodiment 10

According to embodiment 10 of the present invention, it is able to configure a maximum value to be reflected (or inherited) among accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1, which are formed due to SD_PC mode configuration or due to the configuration of the number of uplink subframe sets set to 2 in the SD_PC mode. Or, it is able to configure a minimum value to be reflected (or inherited) among accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1, which are formed due to SD_PC mode configuration or due to the configuration of the number of uplink subframe sets set to 2 in the SD_PC mode.

Embodiment 11

According to embodiment 11 of the present invention, it is able to configure an operation of reflecting (inheriting) an accumulation value of a closed-loop power control parameter (e.g., $f_{SD\_PC\_SET0,c}(i)$) related to SD_PC_SET0, which is formed due to SD_PC mode configuration or due to the configuration of the number of uplink subframe sets set to 2 in the SD_PC mode, to be restrictively applied to a case that open-loop parameters are configured (maintained) by a value identical to a part (or all) of open-loop (OLPC) parameters (e.g., $P_{O\_UE\_PUSCH,c}$, $P_{O\_NOMINAL\_PUSCH,c}$, $\alpha_c$) related to the SD_PC_SET0 after the SD_PC mode is disabled or the number of uplink subframe sets is changed into 1 in the SD_PC mode).

Or, it is able to configure an operation of reflecting (inheriting) an accumulation value of a closed-loop power control parameter (e.g., $f_{SD\_PC\_SET1,c}(i)$) related to SD_PC_SET1, which is formed due to SD_PC mode configuration or due to the configuration of the number of uplink subframe sets set to 2 in the SD_PC mode, to be restrictively applied to a case that open-loop parameters are configured (maintained) by a value identical to a part (or all) of open-loop (OLPC) parameters (e.g., $P_{O\_UE\_PUSCH,c}$, $P_{O\_NOMINAL\_PUSCH,c}$, $\alpha_c$) related to the SD_PC_SET1 after the SD_PC mode is disabled or the number of uplink subframe set is changed into 1 in the SD_PC mode.

Embodiment 12

According to embodiment 12 of the present invention, it is able to configure an accumulation value of an uplink subframe set-related closed-loop power control parameter (e.g., $f_{SD\_PC\_SET0,c}(i)$, $f_{SD\_PC\_SET1,c}(i)$) having a lowest or relatively low subframe set index (e.g., 0) to be reflected (inherited) only among uplink subframe sets of which interference characteristic is different from each other, which are formed due to SD_PC mode configuration or due to the configuration of the number of uplink subframe sets set to 2 in the SD_PC mode. For example, it is able to configure a lowest subframe set index (e.g., 0) to be assigned to an uplink subframe set having interference characteristic of I_UU or it is able to configure a lowest subframe set index (e.g., 0) to be assigned to an uplink subframe set having interference characteristic of I_DU.

Or, it is able to configure an accumulation value of an uplink subframe set-related closed-loop power control parameter (e.g., $f_{SD\_PC\_SET0,c}(i)$, $f_{SD\_PC\_SET1,c}(i)$) having a highest (or relatively high) subframe set index (e.g., 1) to be reflected (inherited) only among uplink subframe sets of which interference characteristic is different from each other, which are formed due to SD_PC mode configuration or due to the configuration of the number of uplink subframe sets set to 2 in the SD_PC mode. In this case, as an example, it is able to configure a highest subframe set index (e.g., 1) to be assigned to an uplink subframe set having interference characteristic of I_UU or it is able to configure a highest subframe set index (e.g., 1) to be assigned to an uplink subframe set having interference characteristic of I_DU.

Embodiment 13

According to embodiment 13 of the present invention, among accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1, which are formed due to SD_PC mode configuration or due to the configuration of the number of uplink subframe sets set to 2 in the SD_PC mode, it is able to configure a base station (or a cell) to inform (signal) a UE of i) an uplink subframe set index or ii) a UL PC process index (i.e., a specific UL PC process index is interlocked with a specific uplink subframe set index) to which an accumulation value of an uplink communication-related closed-loop power control parameter (e.g., $F_c(i)$) is inherited (reflected).

In this case, it is able to configure the information according to the present embodiment to be transmitted in a manner of being included in a usage change message (reconfiguration message) (transmitted based on a predetermined period) or it is able to configure the information to be transmitted via a predefined (additional) signal (e.g., a higher layer signal or a physical layer signal).

A proposed scheme described in the following corresponds to a method of efficiently reflecting (inheriting) an accumulation value of closed-loop power control parameters (e.g., $f_{SD\_PC\_SET0,c}(i)$, $f_{SD\_PC\_SET1,c}(i)$) related to a specific uplink subframe set (e.g., SD_PC_SET1 and/or SD_PC_SET2) when separate accumulation of a closed-loop power control (CLPC) parameter (e.g., $f_c(i)$) according to a subframe set (e.g., SD_PC_SET0, SD_PC_SET1) is disabled (i.e., uplink subframe sets different from each other assume accumulation of a common closed-loop power control (CLPC) parameter (e.g., assume accumulation of $f_c(i)$) in a state that the SD_PC mode is set.

In the following, for clarity, when separate accumulation of a closed-loop power control (CLPC) parameter according to a subframe set is disabled, it is referred to as "SEPARATE_ACCUMULATION-DISABLE". And, when separate accumulation of a closed-loop power control (CLPC) parameter according to a subframe set is enabled, it is referred to as "SEPARATE_ACCUMULATION-ENABLE".

Embodiment 14

According to embodiment 14 of the present invention, it is able to configure all accumulation values of closed-loop power control parameters (e.g., $f_{SD\_PC\_SET0,c}(i)$, $f_{SD\_PC\_SET1,c}(i)$) related to SD_PC_SET0 and SD_PC_SET1 not to be reflected (or inherited). In particular, the accumulation values of the closed-loop power control parameters (e.g., $f_{SD\_PC\_SET0,c}(i)$, $f_{SD\_PC\_SET1,c}(i)$) related to the SD_PC_SET0 and the SD_PC_SET1 can be initialized or reset due to SEPARATE_ACCUMULATION-DISABLE.

Embodiment 15

According to embodiment 15 of the present invention, it is able to configure an accumulation value of closed-loop power control parameter (e.g., $f_{SD\_PC\_SET0,c}(i)$) related to SD_PC_SET0 to be reflected (or inherited) only. In particular, in terms of SD_PC_SET1 (i.e., an uplink subframe set having interference characteristic of I_DU), an accumulation value of closed-loop power control parameter (e.g., $f_{SD\_PC\_SET1,c}(i)$) related to the SD_PC_SET1 can be initialized or reset due to SEPARATE_ACCUMULATION-DISABLE. Moreover, if the accumulation value of the closed-loop power control parameter (e.g., $f_{SD\_PC\_SET0,c}(i)$) related to the SD_PC_SET0 is reflected (inherited) only, it is able to configure a result value by which a predefined (signaled) weight is multiplied to be reflected (inherited).

Or, It is able to configure the accumulation value of the closed-loop power control parameter (e.g., $f_{SD\_PC\_SET1,c}(i)$) related to the SD_PC_SET1 to be reflected (or inherited) only. In this case, if the accumulation value of the closed-loop power control parameter (e.g., $f_{SD\_PC\_SET1,c}(i)$) related to the SD_PC_SET1 is reflected (inherited) only, it is able to configure a result value by which a predefined (signaled) weight is multiplied to be reflected (inherited).

Embodiment 16

According to embodiment 16 of the present invention, it is able to configure accumulation values of closed-loop power control parameters (e.g., $f_{SD\_PC\_SET0,c}(i)$, $f_{SD\_PC\_SET1,c}(i)$) related to SD_PC_SET0 and SD_PC_SET1 to be proportionally reflected (inherited) based on a predefined configuration/rule/function. For example, it is able to configure i) an arithmetic/geometric/weighted average value, ii) a minimum value or iii) a maximum value of the accumulation values of the closed-loop power control parameter (e.g., $f_{SD\_PC\_SET0,c}(i)$, $f_{SD\_PC\_SET1,c}(i)$) related to the SD_PC_SET0 and the SD_PC_SET1 to be reflected (inherited).

Embodiment 17

According to embodiment 17 of the present invention, it is able to configure a maximum value to be reflected (or inherited) among accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1. Or, it is able to configure a minimum value to be reflected (or inherited) among accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1.

Embodiment 18

According to embodiment 18 of the present invention, it is able to configure an operation of reflecting (inheriting) an accumulation value of a closed-loop power control parameter (e.g., $f_{SD\_PC\_SET0,c}(i)$) related to SD_PC_SET0 to be restrictively applied to a case that a part (or all) of open-loop (OLPC) parameters (e.g., $P_{O\_UE\_PUSCH,c}$, $P_{O\_NOMINAL\_PUSCH,c}$, $\alpha_c$) related to the SD_PC_SET0 are identically maintained with previous (i.e., SEPARATE_ACCUMULATION-ENABLE) values or a case that a part (or all) of open-loop (OLPC) parameters related to the SD_PC_SET0 and the SD_PC_SET1 are identically maintained with previous (i.e., SEPARATE_ACCUMULATION-ENABLE) values only after SEPARATE_ACCUMULATION-DISABLE.

As a different example, it is able to configure an operation of reflecting (inheriting) an accumulation value of a closed-loop power control parameter (e.g., $f_{SD\_PC\_SET1,c}(i)$) related to SD_PC_SET1 to be restrictively applied to a case that a part (or all) of open-loop (OLPC) parameters (e.g., $P_{O\_UE\_PUSCH,c}$, $P_{O\_NOMINAL\_PUSCH,c}$, $\alpha_c$) related to the SD_PC_SET1 are identically maintained with previous (i.e., SEPARATE_ACCUMULATION-ENABLE) values or a case that a part (or all) of open-loop (OLPC) parameters related to the SD_PC_SET0 and the SD_PC_SET1 are identically maintained with previous (i.e., SEPARATE_ACCUMULATION-ENABLE) values) only after SEPARATE_ACCUMULATION-DISABLE.

Embodiment 19

According to embodiment 19 of the present invention, it is able to configure an accumulation value of an uplink subframe set-related closed-loop power control parameter (e.g., $f_{SD\_PC\_SET0,c}(i)$, $f_{SD\_PC\_SET1,c}(i)$) having a lowest or a relatively low subframe set index (e.g., 0) to be reflected (inherited) only among uplink subframe sets of which interference characteristic is different from each other. For example, it is able to configure a lowest subframe set index (e.g., 0) to be assigned to an uplink subframe set having interference characteristic of I_UU or an uplink subframe set having interference characteristic of I_DU.

Or, it is able to configure an accumulation value of an uplink subframe set-related closed-loop power control parameter (e.g., $f_{SD\_PC\_SET0,c}(i)$, $f_{SD\_PC\_SET1,c}(i)$) having a highest or a relatively high subframe set index (e.g., 1) to be reflected (inherited) only among uplink subframe sets of which interference characteristic is different from each other. For example, it is able to configure a highest subframe set index (e.g., 1) to be assigned to an uplink subframe set having interference characteristic of I_UU or an uplink subframe set having interference characteristic of I_DU.

Embodiment 20

According to embodiment 20 of the present invention, among accumulation values of a closed-loop power control parameter (e.g., $f_{SD\_PC\_SET0,c}(i)$, $f_{SD\_PC\_SET1,c}(i)$) related to SD_PC_SET0 and SD_PC_SET1, it is able to configure a base station (or a cell) to inform (signal) a UE of i) an uplink subframe set index or ii) a UL PC process index (i.e., a specific UL PC process index is interlocked with a specific uplink subframe set index) to which an accumulation value is inherited (reflected). In this case, it is able to configure the information to be transmitted in a manner of being included in a usage change message (reconfiguration message) (transmitted based on a predetermined period) or it is able to configure the information to be transmitted via a predefined (additional) signal (e.g., a higher layer signal or a physical layer signal.

In the following, a method of efficiently reflecting (inheriting) an accumulation value of uplink communication-related closed-loop power control (CLPC) parameter (e.g., $f_c(i)$) in SEPARATE_ACCUMULATION-DISABLE operation according to the present invention is explained when SEPARATE_ACCUMULATION-DISABLE is changed into SEPARATE_ACCUMULATION-ENABLE in a state that SD_PC mode is set.

Embodiment 21

According to embodiment 21 of the present invention, it is able to configure an accumulation value of uplink communication-related closed-loop power control (CLPC) parameter (e.g., $f_c(i)$) not to be reflected (inherited) to SD_PC_SET0 and the SD_PC_SET1 in SEPARATE_ACCUMULATION-DISABLE operation. In particular, according to the present embodiment, the accumulation value of the uplink communication-related closed-loop power control (CLPC) parameter (e.g., $f_c(i)$) in the SEPARATE_ACCUMULATION-DISABLE operation can be initialized or reset due to SEPARATE_ACCUMULATION-ENABLE.

Embodiment 22

According to embodiment 22 of the present invention, it is able to configure an accumulation value of uplink communication-related closed-loop power control (CLPC) parameter (e.g., $f_c(i)$) in the SEPARATE_ACCUMULATION-DISABLE operation to be reflected (inherited) to SD_PC_SET0 (i.e., an uplink subframe set having interference characteristic of I_UU) only.

In particular, in terms of SD_PC_SET1 (i.e., an uplink subframe set having interference characteristic of I_DU), the accumulation value of the uplink communication-related closed-loop power control (CLPC) parameter (e.g., $f_c(i)$) in the SEPARATE_ACCUMULATION-DISABLE operation can be initialized or reset due to SEPARATE_ACCUMULATION-ENABLE. Moreover, if the accumulation value of the uplink communication-related closed-loop power control (CLPC) parameter (e.g., $f_c(i)$) in SEPARATE_ACCUMULATION-DISABLE operation is reflected (inherited) to the SD_PC_SET0, it is able to configure a result value by which a predefined (signaled) weight is multiplied to be reflected (inherited).

Or, it is able to configure an accumulation value of uplink communication-related closed-loop power control (CLPC) parameter (e.g., $f_c(i)$) in SEPARATE_ACCUMULATION-DISABLE operation to be reflected (inherited) to SD_PC_SET1 (i.e., an uplink subframe set having interference characteristic of I_DU) only. In this case, if the accumulation value of the uplink communication-related closed-loop power control (CLPC) parameter (e.g., $f_c(i)$) in SEPARATE_ACCUMULATION-DISABLE operation is reflected (inherited) to the SD_PC_SET1, it is able to configure a result value by which a predefined (signaled) weight is multiplied to be reflected (inherited).

Embodiment 23

According to embodiment 23 of the present invention, it is able to configure an accumulation value of uplink communication-related closed-loop power control parameter (e.g., $f_c(i)$) in SEPARATE_ACCUMULATION-DISABLE operation to be reflected (inherited) to SD_PC_SET0 and the SD_PC_SET1.

In this case, if the accumulation value of the uplink communication-related closed-loop power control parameter (e.g., $f_c(i)$) in SEPARATE_ACCUMULATION-DISABLE operation is reflected (inherited) to the SD_PC_SET0 and the SD_PC_SET1, it is able to configure result values by which predefined (signaled) different (or identical) weights are multiplied to be reflected (inherited) according to an uplink subframe set (i.e., SD_PC_SET0, SD_PC_SET1) having a different interference characteristic.

Embodiment 24

According to embodiment 24 of the present invention, an operation of reflecting (inheriting) an accumulation value of an uplink communication-related closed-loop power control parameter (e.g., $f_c(i)$) in SEPARATE_ACCUMULATION-DISABLE operation to SD_PC_SET0 (i.e., an uplink subframe set having interference characteristic of I_UU) only can be configured to be restrictively applied to a case that a part (or all) of open-loop (OLPC) parameters (e.g., $P_{O\_UE\_PUSCH,c}$, $P_{O\_NOMINAL\_PUSCH,c}$, $\alpha_c$) related to the SD_PC_SET0 are identically maintained with previous (i.e., SEPARATE_ACCUMULATION-DISABLE) values or a case that a part (or all) of open-loop (OLPC) parameters related to the SD_PC_SET0 and the SD_PC_SET1 are identically maintained with previous (i.e., SEPARATE_ACCUMULATION-DISABLE) values only after SEPARATE_ACCUMULATION-ENABLE.

Or, an operation of reflecting (inheriting) an accumulation value of an uplink communication-related closed-loop power control parameter (e.g., $f_c(i)$) in SEPARATE_ACCUMULATION-DISABLE operation to SD_PC_SET1 (i.e., an uplink subframe set having interference characteristic of I_DU) only can be configured to be restrictively applied to a case that a part (or all) of open-loop (OLPC) parameters (e.g., $P_{O\_UE\_PUSCH,c}$, $P_{O\_NOMINAL\_PUSCH,c}$, $\alpha_c$) related to the SD_PC_SET1 are identically maintained with previous (i.e., SEPARATE_ACCUMULATION-DISABLE) values or a case that a part (or all) of open-loop (OLPC) parameters related to the SD_PC_SET0 and the SD_PC_SET1 are identically maintained with previous (i.e., SEPARATE_ACCUMULATION-DISABLE) values only after SEPARATE_ACCUMULATION-ENABLE.

Embodiment 25

According to embodiment 25 of the present invention, it is able to configure an accumulation value of uplink communication-related closed-loop power control parameter (e.g., $f_c(i)$) in SEPARATE_ACCUMULATION-DISABLE operation to be reflected (inherited) to an uplink subframe set having a lowest or a relatively low subframe set index (e.g., 0) only among uplink subframe sets of which interference characteristic is different from each other. For example, it is able to configure the lowest subframe set index (e.g., 0) to be assigned to an uplink subframe set having interference characteristic of I_UU or an uplink subframe set having interference characteristic of I_DU.

Or, it is able to configure an accumulation value of uplink communication-related closed-loop power control parameter (e.g., $f_c(i)$) in SEPARATE_ACCUMULATION-DISABLE operation to be reflected (inherited) to an uplink subframe set having a highest or a relatively high subframe set index (e.g., 1) only among uplink subframe sets of which interference characteristic is different from each other. For example, it is able to configure the lowest subframe set index (e.g., 0) to be assigned to an uplink subframe set having interference characteristic of I_UU or an uplink subframe set having interference characteristic of I_DU.

Embodiment 26

According to embodiment 26 of the present invention, it is able to configure a base station (or a cell) to inform (signal) a UE of an uplink subframe set index or a UL PC process index (i.e., a specific UL PC process index is interlocked with a specific uplink subframe set index) to which an accumulation value of an uplink communication-related closed-loop power control parameter (e.g., $F_c(i)$) in SEPARATE_ACCUMULATION-DISABLE operation is inherited (reflected).

In this case, it is able to configure the information to be transmitted in a manner of being included in a usage change message (reconfiguration message) (transmitted based on a predetermined period) or it is able to configure the information to be transmitted via a predefined (additional) signal (e.g., a higher layer signal or a physical layer signal).

In the following, a method of efficiently initializing (resetting) an accumulation value of a closed-loop power control (CLPC) parameter (e.g., $f_c(i)$) according to a subframe set under environment to which an SD_PC mode is applied is explained according to the present invention.

Embodiment 27

According to embodiment 27 of the present invention, it is able to configure an accumulation value of a closed-loop power control (CLPC) parameter (e.g., $f_c(i)$) according to a subframe set to be initialized (reset) if a change occurs in a part (or all) of parameters described in the following (and/or if predefined specific information (or message) is received) under environment to which an SD_PC mode is applied. In this case, an initializing (resetting) operation can be comprehended as the accumulation value of the closed-loop power control (CLPC) parameter (e.g., $f_c(i)$) according to a subframe set is reconfigured by a predefined (signaled) specific value.

- Change in the number of uplink subframe sets
- Change in an uplink subframe set pattern
- Change in whether or not a closed-loop power control (CLPC) parameter is separately accumulated (SEPARATE_ACCUMULATION-ENABLE, SEPARATE_ACCUMULATION-DISABLE) according to a subframe set
- Change in a part (or all) of open-loop (OLPC) parameters (e.g., $P_{O\_UE\_PUSCH,c}$, $P_{O\_NOMINAL\_PUSCH,c}$, $\alpha c$) (according to a subframe set)
- When a UE receives a random access response (RAR) message (e.g., RAR message for PCell)
- When a UE receives a usage change message (reconfiguration message) (based on predetermined period). In this case, an accumulation value of a closed-loop power control (CLPC) parameter (e.g., fc(i)) according to a subframe set can be configured to be restrictively initialized (reset) only when (updated) UL-DL configuration on a received usage change message is different from previous (or current) UL-DL configuration.

TPC Command on Subframe-Dependent Uplink Power Control Mode

In a legacy UL-DL configuration #0, an (accumulative and/or absolute) TPC command (e.g., DCI format 0/4/3/3A) received at specific downlink subframe timing (together with a specific UL index field value configuration (e.g., 11)) is defined to be applied to a plurality of (e.g., 2) uplink subframe timings or uplink data channels transmitted at a plurality of the uplink subframe timings at the same time) For example, a UL index field (i.e., 2 bits) of DCI format 0/4 related to uplink data channel scheduling and/or uplink transmission power control is set to "11" (i.e., uplink data channels (PUSCH) are transmitted at 2 uplink subframe timings by single uplink scheduling information (UL grant) received at specific downlink subframe timing) or "10".

However, if a plurality of the uplink subframe timings respectively belong to uplink subframe sets different from each other (e.g., SD_PCSET0, SD_PC_SET1 (i.e., uplink subframe sets of which interference characteristic is different from each other)) in a state that an SD_PC mode is set, it is unable to precisely identify an uplink subframe set to which the (accumulative and/or absolute) TPC command received at the specific downlink subframe timing (together with a specific UL index field value configuration (e.g., 11)) is targeting.

Hence, configurations for efficiently processing (reflecting) the TPC command received at the specific downlink subframe timing (together with a specific UL index field value configuration (e.g., 11)) are proposed in the following. In this case, the configurations described in the following can be configured to be restrictively applied to a specific DCI format (i.e., DCI format 3/3A or DCI format 0/4) only to notify information on the (accumulative and/or absolute) TPC command. And, the configurations can be configured to be independently implemented (applied) or can be configured to be implemented (applied) by a combination (e.g., combination of [configuration #B] and [configuration #C]) of the configurations.

Configuration #A: An (accumulative and/or absolute) TPC command received at specific downlink subframe timing (together with a specific UL index field value configuration (e.g., 11)) may target i) a plurality of (e.g., 2) uplink subframe timings or ii) uplink data channels transmitted at a plurality of the uplink subframe timings. In this case, if a plurality of the uplink subframe timings respectively belong to uplink subframe sets different from each other (e.g., SD_PCSET0, SD_PC_SET1), it is able to configure a UE to apply the TPC command to a predetermined (signaled) UL PC process related to a specific uplink subframe set only. For example, a base station can inform a UE of an uplink subframe set to which the TPC command received at the specific downlink subframe timing (together with a specific UL index field value configuration (e.g., 11)) is targeting using a bitmap form of a predetermined length (e.g., if a TPC command is received in a downlink subframe corresponding to a position where a bit is set to '1', the TPC command can be interpreted as being related to SD_PC_SET0).

Configuration #B: An (accumulative and/or absolute) TPC command received at specific downlink subframe timing (together with a specific UL index field value configuration (e.g., 11)) may target i) a plurality of (e.g., 2) uplink subframe timings or ii) uplink data channels transmitted at a plurality of the uplink subframe timings). In this case, if a plurality of the uplink subframe timings respectively belong to uplink subframe sets different from each other (e.g., SD_PCSET0, SD_PC_SET1), it is able to configure the (identical) TPC command to be applied to all UL PC processes related to the subframe sets different from each other (according to a legacy configuration).

Configuration #C: An (accumulative and/or absolute) TPC command received at specific downlink subframe timing (together with a specific UL index field value configuration (e.g., 11)) may target i) a plurality of (e.g., 2) uplink subframe timings or ii) uplink data channels transmitted at a plurality of the uplink subframe timings. In this case, if a plurality of the uplink subframe timings respectively belong to uplink subframe sets different from each other (e.g., SD_PCSET0, SD_PC_SET1), it is able to configure the TPC command to be applied to a UL PC process related to the uplink subframe set only (according to a legacy configuration).

Configuration #D: An (accumulative and/or absolute) TPC command received at specific downlink subframe timing (together with a specific UL index field value configuration (e.g., 11)) may target i) a plurality of (e.g., 2) uplink subframe timings or ii) uplink data channels transmitted at a plurality of the uplink subframe timings. In this case, it is able to configure the (identical) TPC command to be applied to all UL PC processes related to the uplink subframe sets different from each other according to a predefined configuration/rule.

In particular, according to the configuration #D, the (identical) TPC command can be applied to all UL PC processes related to the uplink subframe sets different from each other irrespective of whether or not a plurality of the uplink subframe timings to which the (accumulative and/or absolute) TPC command received at the specific downlink subframe timing (together with the specific UL index field value configuration (e.g., 11)) is targeting respectively belong to the subframe sets (e.g., SD_PCSET0 or SD_PC_SET1) different from each other. In this case, a DCI format in which the (accumulative and/or absolute) TPC command is transmitted can be restricted to a DCI format 3/3A or a DCI format 0/4.

Configuration #E: It is able to configure an (accumulative and/or absolute) TPC command on a specific DCI format to be applied to all UL PC processes related to uplink subframe sets different from each other according to a predetermined configuration/rule. In this case, a DCI format in which the (accumulative and/or absolute) TPC command is transmitted can be restricted to a DCI format 3/3A or a DCI format 0/4.

Configuration #F: A field (e.g., 1 bit) for indicating an uplink subframe set to which a TPC command is targeting can be added to a DCI format in relation to transmission of information on the TPC command. In this case, as a different example, it may be able to implement a form of reinterpreting a meaning of a legacy field instead of newly adding the field.

In particular, power control parameter configuration and PHR can be adjusted according to the present invention.

Regarding a power control parameter for two subframe sets, UE can be configured with UE-specific P0 and cell-specific α by RRC signaling. When the UE is configured for TDD eIMTA operations, the UE can be configured with (up to) two subframe sets. For each subframe set, different P0 and α values can be used, but the relationship between such legacy parameters of (e.g., UE-specific P0 and cell-specific α) and newly configured P0 and α is not clearly defined yet.

Specifically, when a UE is configured with two subframe sets (Set #1 and Set #2), it needs to be decided whether each subframe set in the two-set configuration message is always accompanied by the associated PC parameter set.

If it is allowed to reuse the legacy parameters for one of the two sets, it seems needed to have such parameters of P0 and alpha per subframe set being optionally present in the relevant RRC signaling of subframe set configurations. It means that if such parameters of P0 and alpha are not present in a RRC message for a subframe set, the subframe set is linked to the legacy parameters of {UE-specific P0 and cell-specific alpha} to be used for UL PC.

If there is a common understanding that same legacy parameters are always used for Set#1, the PC parameter configuration part can be omitted in the RRC message for Set#1. If the PC parameter configuration is a mandatory part for both sets in the RRC message, the UL PC is always reset in both sets whenever two subframe sets are configured.

Similarly, in case when a fallback to only one subframe set is indicated by RRC signaling to the UE, it needs to be decided whether the current legacy parameters of {UE-specific P0 and cell-specific α} are applied to all subframes, or new parameters should be signaled to the UE via the fallback message regardless of the current legacy parameters.

Another possible option can be maintaining the parameters of P0 and α for Set#1 to be inherited and applied to all subframes by the fallback indication, which in turn means the parameters linked to Set#2 are only discarded once the fallback indication is received. If both possibilities need to be supported, it is possible to have the PC parameters to be used when falls back to one subframe set as an optional one.

In particular, when UE is configured with up to two subframe sets, the relationship between existing legacy parameters of {UE-specific P0 and cell-specific α} and newly configured P0 and α (per subframe set) needs to be clarified. When a fallback to one subframe set is indicated by RRC signaling to the UE, it needs to be decided whether the existing legacy parameters of {UE-specific P0 and cell-specific α} are applied to all subframes, or new parameters should be signaled to the UE via the fallback message.

Subsequently, PHR (power headroom report) is explained in more detail.

The current PHR mechanism can allow PHR for two subframe sets. To be specific, according to the current specification, PHRs are estimated and transmitted at the same subframe where PUSCH is transmitted. So, for each subframe set, the PHR is obtained at one subframe belonging to the subframe set. However, in such operation, there exist some restrictions on obtaining the PHRs for two subframe sets from the perspective of an eNB.

Firstly, there will be an UL resource waste or an UL scheduling overhead increment to obtain the PHRs for two subframe sets. This is because an eNB can get only PHR for one subframe set at a time. In addition, this drawback may also causes an additional problem that it is hard for an eNB to get the PHRs of two subframe sets in time.

Secondly, it is hard for an eNB to infer the PHR value of one subframe set from that of another subframe set. The reason is that the pathloss value is in general unknown to an eNB, and if TPC accumulation is enabled, $f_c(i)$ in [6] is also unknown to an eNB since a UE may be able to miss TPC command.

To resolve the above-mentioned restrictions of the current PHR mechanism, the PHR enhancement could be needed. Firstly, if the PHR is triggered, it can be interpreted that the PHRs of all subframe sets are triggered and reported. Here, each PHR value is calculated on the basis of the power control parameter set associated with the each subframe set.

Secondly, with regard to the PHR reporting timing of each subframe set, the following two options can be considered. The first one is that the PHRs of all subframe sets will be reported simultaneously in the same subframe. The second one is that the PHR of each subframe set will be reported at one subframe which belongs to the each subframe set. The former may require more specification works to design a new container (carrying PHRs of multiple subframe sets of a single CC), but it can provide an eNB with PHRs of all subframe sets in a short time.

Thirdly, if the PHR is triggered, it can be interpreted that the representative PHR is reported to an eNB. Here, for example, the representative PHR can be defined as the minimum value among PHRs of all subframe sets. This scheme does not have an impact to other working groups.

Regarding the power limitation in an eIMTA-operating system, it needs to be reminded that subframe-set specific power control is useful in mitigating interferences from pico cells to macro cells in the scenario of macro-pico adjacent channel. So, PHR enhancement is expected to be useful more for macro UEs in that scenario.

In particular, according to the present invention, if PHR is triggered based on the PH reporting procedures, PHs of all subframe sets are triggered and reported. With regard to the PHR reporting timing of each subframe set, the two options can be considered; the first option is that the PHRs of all subframe sets will be reported simultaneously in the same subframe, while the second option is that the PHR of each subframe set will be reported at one subframe which belongs to the each subframe set. In addition, if the PHR is triggered, it can be interpreted that the representative PHR, e.g., the minimum value among PHRs of all subframe sets, is reported to an eNB.

In the present invention, if an accumulation value of a closed-loop power control parameter (e.g., $f_c(i)$) related to a specific uplink subframe set is reflected (inherited) to a different uplink subframe set, it indicates that the accumulation value of the closed-loop power control parameter (e.g., $f_c(i)$) of a UL PC process interlocked with the specific uplink subframe set is inherited (reflected) to an initial value (e.g., $f_c(0)$) of accumulation of the closed-loop power control parameter (e.g., $f_c(i)$) of a UL PC process interlocked with the different uplink subframe set.

And, the aforementioned embodiments of the present invention can be extensively applied to at least one selected from the group consisting of an SD_PC mode, a non-SD_PC mode, a SEPARATE_ACCUMULATION-DISABLE mode and a SEPARATE_ACCUMULATION-ENABLE mode.

And, the aforementioned embodiments of the present invention can also be extensively applied to a case that the number of uplink subframe sets to which an independent UL PC process is applied in the SD_PC mode (having different interference characteristic) is set to 3 or more.

And, the aforementioned embodiments of the present invention can also be extensively applied to i) a case that a change occurs in the number of uplink subframe sets and/or ii) a case that a change occurs in an uplink subframe set pattern and/or iii) a case that a change occurs on whether or not a closed-loop power control (CLPC) parameter according to a subframe set is separately accumulated (SEPARATE_ACCUMULATION-ENABLE, SEPARATE_ACCUMULATION-DISABLE) and/or iv) a case that a change occurs in a part (or all) of open-loop (OLPC) parameters (e.g., $P_{O\_UE\_PUSCH,c}$, $P_{O\_NOMINAL\_PUSCH,c}$, $\alpha c$) (according to a subframe set) and/or v) a case that a change occurs on whether or not a UE receives a random access response (RAR) message (e.g., RAR message for PCell).

Since the aforementioned embodiments/configurations are capable of being included as one of methods of implementing the present invention, it is apparent that the embodiments/configurations can be considered as a sort of proposed schemes. And, the embodiments of the present invention can be independently implemented and can be implemented in a combination form of a part of the embodiments.

And, the aforementioned embodiments of the present invention can also be extensively applied to power control related to an uplink data channel (PUSCH) and/or an uplink control channel (PUCCH) and/or a sounding reference signal (SRS).

And, the aforementioned embodiments of the present invention can be configured to be restrictively applied only when a dynamic change mode of a radio resource usage is set (e.g., when a base station (or cell) sets a dynamic change mode of a radio resource usage to a UE via a predetermined signal).

And, the aforementioned proposed schemes can be configured to be restrictively applied only i) when a closed-loop parameter (or an accumulative calculation mode (accumulative TPC command) of a TPC command (e.g., $f_c(i)$) in which (higher layer signal-related parameter) "Accumulation-enabled" is received is designated, ii) when a closed-loop parameter (or a non-accumulative calculation mode (absolute TPC command) of a TPC command (e.g., $f_c(i)$) in which "Accumulation-enabled" is received is designated, iii) when a closed-loop parameter (or a TPC command) is received via a specific DCI format (e.g., DCI format 0/4 or DCI format 3.3A), iv) when a mode of transmitting PUSCH and PUCCH at the same time is set, v) when a mode of transmitting PUSCH and PUCCH at the same time is not set. The aforementioned proposed schemes can be configured to be restrictively applied to vi) a PCell or a Scell or vii) a specific cell (or a component carrier (CC)) to which a dynamic change mode of a radio resource usage is set only.

Moreover, it is able to configure a base station to inform a UE of information on whether to apply the aforementioned embodiments/configurations of the present invention or information on the aforementioned embodiments/configurations of the present invention via a predetermined signal (e.g., a physical layer signal or a higher layer signal).

Figure 9:
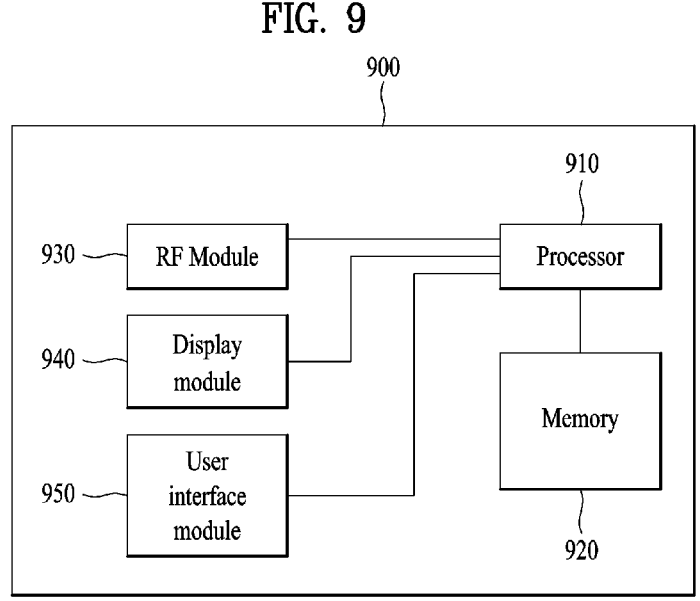
FIG. 9 is a block diagram for a communication device according to one embodiment of the present invention.

FIG. 9 is a block diagram for a communication device according to one embodiment of the present invention.

Referring to FIG. 9, a communication device 900 may include a processor 910, a memory 920, an RF module 930, a display module 940, and a user interface module 950.

Since the communication device 900 is depicted for clarity of description, prescribed module(s) may be omitted in part. The communication device 900 may further include necessary module(s). And, a prescribed module of the communication device 900 may be divided into subdivided modules. A processor 910 is configured to perform an operation according to the embodiments of the present invention illustrated with reference to drawings. In particular, the detailed operation of the processor 910 may refer to the former contents described with reference to FIG. 1 to FIG. 8.

The memory 920 is connected with the processor 910 and stores an operating system, applications, program codes, data, and the like. The RF module 930 is connected with the processor 910 and then performs a function of converting a baseband signal to a radio signal or a function of converting a radio signal to a baseband signal. To this end, the RF module 930 performs an analog conversion, amplification, a filtering, and a frequency up conversion, or performs processes inverse to the former processes. The display module 940 is connected with the processor 910 and displays various kinds of informations. And, the display module 940 can be implemented using such a well-known component as an LCD (liquid crystal display), an LED (light emitting diode), an OLED (organic light emitting diode) display and the like, by which the present invention may be non-limited. The user interface module 950 is connected with the processor 910 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The aforementioned embodiments of the present invention can be applied to various mobile communication systems.

What is claimed is:

1. A method of controlling uplink transmission power by a user equipment in a wireless communication system, comprising the steps of:
   transmitting an uplink signal according to an uplink-downlink configuration predetermined to a serving cell;
   receiving first transmission power control information on a first uplink subframe set and second transmission power control information on a second uplink subframe set from the serving cell; and
   transmitting an uplink data channel (physical uplink shared channel, PUSCH) in a specific subframe contained in the second uplink subframe set according to the second transmission power control information,
   wherein the second uplink subframe set comprises at least one or more uplink subframes designated by higher layer signaling among a plurality of uplink subframes according to the predetermined uplink-downlink configuration.

2. The method of claim 1, wherein the second transmission power control information comprises a value indicating a current PUSCH power control adjustment state for an index of the specific subframe.

3. The method of claim 2, wherein if information on the second uplink subframe set is received, the current PUSCH power control adjustment state is reset.

4. The method of claim 2, wherein if information on the second uplink subframe set is received, the current PUSCH power control adjustment state is set to 0.

5. The method of claim 1, wherein the first uplink subframe set corresponds to a subframe of which a usage of a radio resource is configured not to be changed and wherein the second uplink subframe set corresponds to a subframe of which a usage of a radio resource is configured to be changed.

6. The method of claim 1, wherein the first uplink subframe set and the second uplink subframe set are different from each other in an interference characteristic with a neighbor cell.

7. The method of claim 1, wherein the second uplink subframe set is indicated by a usage change message.

8. The method of claim 1, wherein the specific subframe is indicated by downlink control information in a DCI format 0/4.

9. A user equipment controlling uplink transmission power in a wireless communication system, comprising:
   a radio frequency unit; and
   a processor, the processor configured to transmit an uplink signal according to an uplink-downlink configuration predetermined to a serving cell, the processor configured to receive first transmission power control information on a first uplink subframe set and second transmission power control information on a second uplink subframe set from the serving cell, the processor configured to transmit an uplink data channel (physical uplink shared channel (PUSCH)) in a specific subframe contained in the second uplink subframe set according to the second transmission power control information,
   wherein the second uplink subframe set comprises at least one or more uplink subframes designated by higher layer signaling among a plurality of uplink subframes according to the predetermined uplink-downlink configuration.

10. The user equipment of claim 9, wherein the second transmission power control information comprises a value indicating a current PUSCH power control adjustment state for an index of the specific subframe.

11. The user equipment of claim 10, wherein if information on the second uplink subframe set is received, the current PUSCH power control adjustment state is reset.

12. The user equipment of claim 10, wherein if information on the second uplink subframe set is received, the current PUSCH power control adjustment state is set to 0.

13. The user equipment of claim 9, wherein the first uplink subframe set corresponds to a subframe of which a usage of a radio resource is configured not to be changed and wherein the second uplink subframe set corresponds to a subframe of which a usage of a radio resource is configured to be changed.

14. The user equipment of claim 9, wherein the first uplink subframe set and the second uplink subframe set are different from each other in an interference characteristic with a neighbor cell.

15. The user equipment of claim 9, wherein the second uplink subframe set is indicated by a usage change message.

16. The user equipment of claim 9, wherein the specific subframe is indicated by downlink control information in a DCI format 0/4.

* * * * *